US012591797B2

(12) United States Patent
Hastings et al.

(10) Patent No.: US 12,591,797 B2
(45) Date of Patent: Mar. 31, 2026

(54) GEOMETRICALLY ENHANCED CLIFFORD QUANTUM COMPUTER

(71) Applicant: Microsoft Technology Licensing, LLC, Redmond, WA (US)

(72) Inventors: Matthew Benjamin Hastings, Seattle, WA (US); Zhenghan Wang, Goleta, CA (US); Jeongwan Haah, Bellevue, WA (US); David Alexander Aasen, Santa Barbara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/422,399

(22) Filed: Jan. 25, 2024

(65) Prior Publication Data

US 2025/0165823 A1     May 22, 2025

Related U.S. Application Data

(60) Provisional application No. 63/600,291, filed on Nov. 17, 2023.

(51) Int. Cl.
*G06N 10/20*     (2022.01)
*G06N 10/40*     (2022.01)
*G06N 10/70*     (2022.01)

(52) U.S. Cl.
CPC ............. *G06N 10/20* (2022.01); *G06N 10/40* (2022.01); *G06N 10/70* (2022.01)

(58) Field of Classification Search
CPC ......... G06N 10/20; G06N 10/40; G06N 10/70

USPC .............................................. 326/7; 714/746
See application file for complete search history.

(56) References Cited

U.S. PATENT DOCUMENTS

2025/0005421 A1     1/2025  Zhu et al.

OTHER PUBLICATIONS

Single-shot quantum error correction with the three-dimensional subsystem toric code Aleksander Kubica1, 2, 3, 4 and Michael Vasmer1, 2 arXiv:2106.02621v1 [quant-ph] Jun. 4, 2021 (Year: 2021).*
Kosuke Fukui et al (High threshold fault-tolerant quantum computation with analog quantum error correction, [Submitted on Dec. 1, 2017 (this version), latest version Mar. 6, 2018 (v3)] (Year: 2017).*
Jong Yeon Lee(Decoding Measurement-Prepared Quantum Phases and Transitions: from Ising model to gauge theory, and beyond , arXiv:2208.11699v2 [cond-mat.str-el] Sep. 6, 2022 (Year: 2022).*
"Bendwavy," https://bendwavy.org/klitzing/incmats/icot.htm (Retrieved Jun. 7, 2024): 3 pages.
Bluvstein et al.; "A Quantum Processor Based on Coherent Transport of Entangled Atom Arrays"; Nature, vol. 604, 451; Apr. 21, 2022: pp. 1-21.

(Continued)

*Primary Examiner* — Arnold M Kinkead
(74) *Attorney, Agent, or Firm* — Cantor Colburn LLP; Stephen A Wight

(57)     ABSTRACT

Aspects of the disclosure for reducing a qubit count employed by a quantum circuit include performing a geometric transformation to boundaries of a three-dimensional (3D) toric code, wherein a Hermite normal form is utilized to parameterize the geometric transformation. Aspects include transforming the 3D toric code to a two-dimensional (2D) toric code for the quantum circuit and causing the quantum circuit to execute the 2D toric code.

19 Claims, 17 Drawing Sheets

(56)            References Cited

OTHER PUBLICATIONS

Bombin, Hector; "Single-Shot Fault-Tolerant Quantum Error Correction"; Physical Review X 5, 031043; Sep. 28, 2015: pp. 1-26.

Bravyi, S. et al., "Homological Product Codes"; Proceedings of the Forty-Sixth Annual ACM Symposium on Theory of Computing, (2014); arXiv:1311.0885v1; Nov. 4, 2013: pp. 1-49.

Bravyi, Sergey et al.; "Classification of Topologically Protected Gates for Local Stabilizer Codes"; Physical Review Letters, 110, 170503 (2013); arXiv:1206.1609v1; Jun. 11, 2012: pp. 1-6.

Bravyi, Sergey et al.; "High-Threshold and Low-Overhead Fault-Tolerant Quantum Memory"; arXiv:2308.07915v2; Feb. 22, 2024: pp. 1-36.

Breuckmann, Nikolas P. et al.; "Fold-Transversal Clifford Gates for Quantum Codes"; arXiv:2202.06647v2; Feb. 15, 2022: pp. 1-20.

Briegel et al.; "Measurement-Based Quantum Computation"; Nature Physics 5, arXiv:0910.1116v2; Oct. 9, 2009: pp. 1-20.

Campbell; "A Theory of Single-Shot Error Correction for Adversarial Noise"; Quantum Science and Technology, vol. 4, 025006 Feb. 5, 2019; arXiv:1805.09271v1; May 23, 2018: pp. 1-21.

Dennis et al.; "Topological Quantum Memory"; Journal of Mathematical Physics, vol. 43, No. 9; Sep. 2002: pp. 4452-4505.

Gu, Shouzhen et al.; "Single-Shot Decoding of Good Quantum LDPC Codes"; arXiv:2306.12470v2; Apr. 11, 2024: pp. 1-36.

Haah, Jeongwan et al., "Geometrically Enhanced Clifford Quantum Computer", Microsoft Quantum, Oct. 31, 2023, pp. 1-25.

Hastings, Matthew et al.; "Fiber Bundle Codes: Breaking the N-1/2 Polylog (N) Barrier for Quantum LDPC Codes"; Proceedings of the 53rd Annual ACM SIGACT Symposium on Theory of Computing (2021); arXiv:2009.03921v1; Nov. 6, 2021: pp. 1-32.

Nguyen et al., "The LLL Algorithm: Survey and Applications; Chapter 2: Hermite's Constant and Lattice Algorithms"; Springer; Aug. 2009: pp. 19-69.

Panteleev, Pavel et al.; "Degenerate Quantum LDPC Codes with Good Finite Length Performance"; Quantum 5, 585 (2021); arXiv:1904. 02703v3; Nov. 12, 2021: pp. 1-21.

Scholl, Pascal et al.; "Erasure Conversion in a High-Fidelity Rydberg Quantum Simulator"; Nature, vol. 622, 273; Oct. 12, 2023: pp. 1-18.

Non-Final Office Action mailed on May 7, 2025, in U.S. Appl. No. 18/619,398, 9 pages.

Hastings B Matthew, "Quantum Codes from High-Dimensional Manifolds", 8th Innovations in Theoretical Computer Science Conference, Article No. 25, 2017, pp. 25:1-25:26.

International Search Report and Written Opinion received for PCT Application No. PCT/US2024/053034, Sep. 26, 2025, 14 pages.

Notice of Allowance mailed on Sep. 19, 2025, in U.S. Appl. No. 18/619,398, 07 pages.

Invitation to Pay Additional Fees received for PCT Application No. PCT/US2024/052808, mailed on Nov. 4, 2025, 12 pages.

Scruby, et al., "Numerical Implementation of Just-In-Time Decoding in Novel Lattice Slices Through the Three-Dimensional Surface Code", In Repository of arXiv:2012.08536v3, May 20, 2022, 21 Pages.

Hart Gus L. er al: "Generating Derivative structures: Algorithm and applications": Apr. 22, 2028 (Apr. 22, 2008), XP093326152, Retrieved from the Internet: 16 pages. URL: https://arxiv.org/pdf/0804.3544 (retrieved on Oct. 16, 2025).

International Search Report and Written opinion received for PCT Application No. PCT/US2024/052808, mailed on Jan. 2, 2026, 18 pages.

* cited by examiner

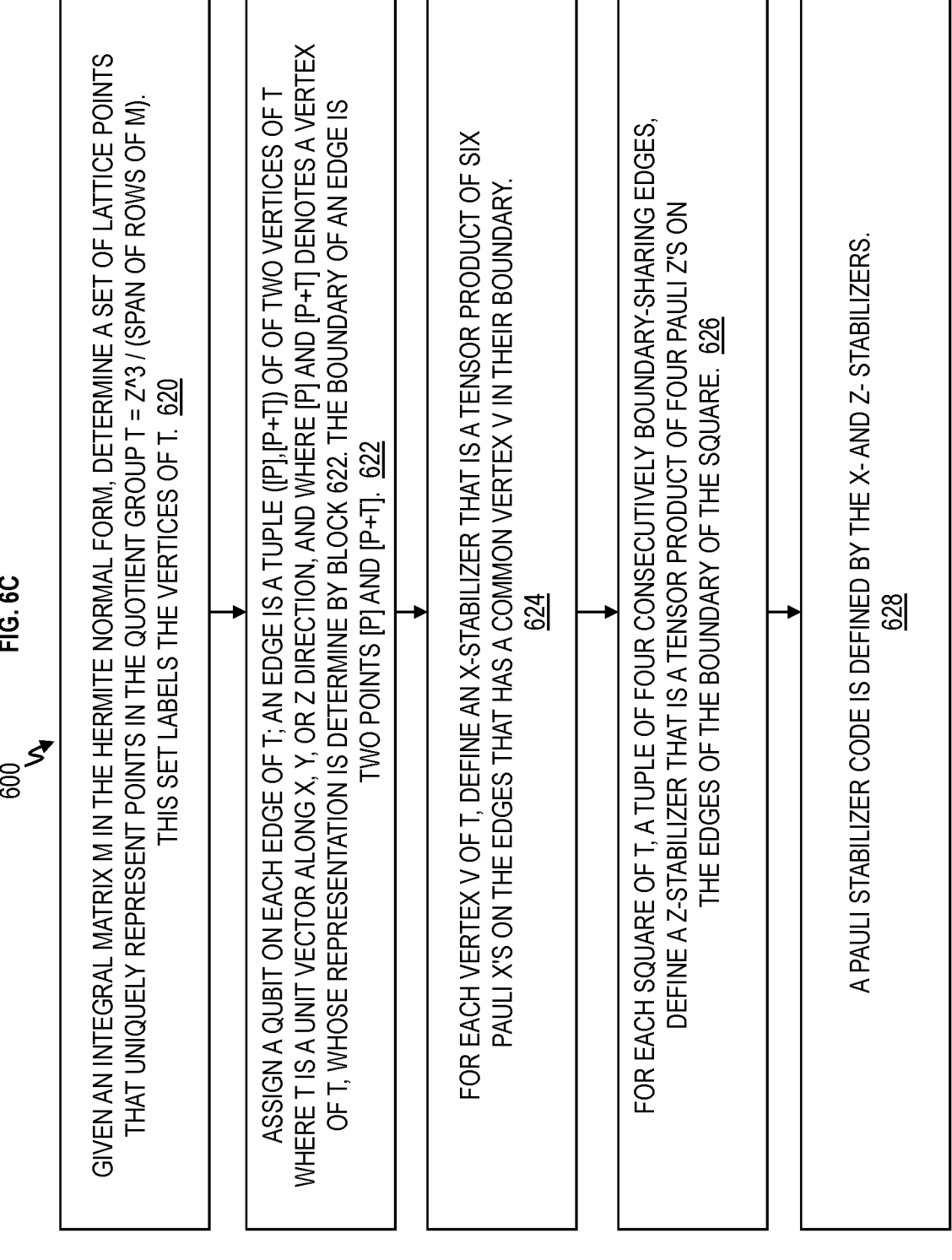

GIVEN AN INTEGRAL MATRIX M IN THE HERMITE NORMAL FORM, DETERMINE A SET OF LATTICE POINTS THAT UNIQUELY REPRESENT POINTS IN THE QUOTIENT GROUP $T = Z^3 / (SPAN OF ROWS OF M)$. THIS SET LABELS THE VERTICES OF T. 620

ASSIGN A QUBIT ON EACH EDGE OF T; AN EDGE IS A TUPLE ([P],[P+T]) OF OF TWO VERTICES OF T WHERE T IS A UNIT VECTOR ALONG X, Y, OR Z DIRECTION, AND WHERE [P] AND [P+T] DENOTES A VERTEX OF T, WHOSE REPRESENTATION IS DETERMINE BY BLOCK 622. THE BOUNDARY OF AN EDGE IS TWO POINTS [P] AND [P+T]. 622

FOR EACH VERTEX V OF T, DEFINE AN X-STABILIZER THAT IS A TENSOR PRODUCT OF SIX PAULI X'S ON THE EDGES THAT HAS A COMMON VERTEX V IN THEIR BOUNDARY. 624

FOR EACH SQUARE OF T, A TUPLE OF FOUR CONSECUTIVELY BOUNDARY-SHARING EDGES, DEFINE A Z-STABILIZER THAT IS A TENSOR PRODUCT OF FOUR PAULI Z'S ON THE EDGES OF THE BOUNDARY OF THE SQUARE. 626

A PAULI STABILIZER CODE IS DEFINED BY THE X- AND Z- STABILIZERS. 628

Figure 7:
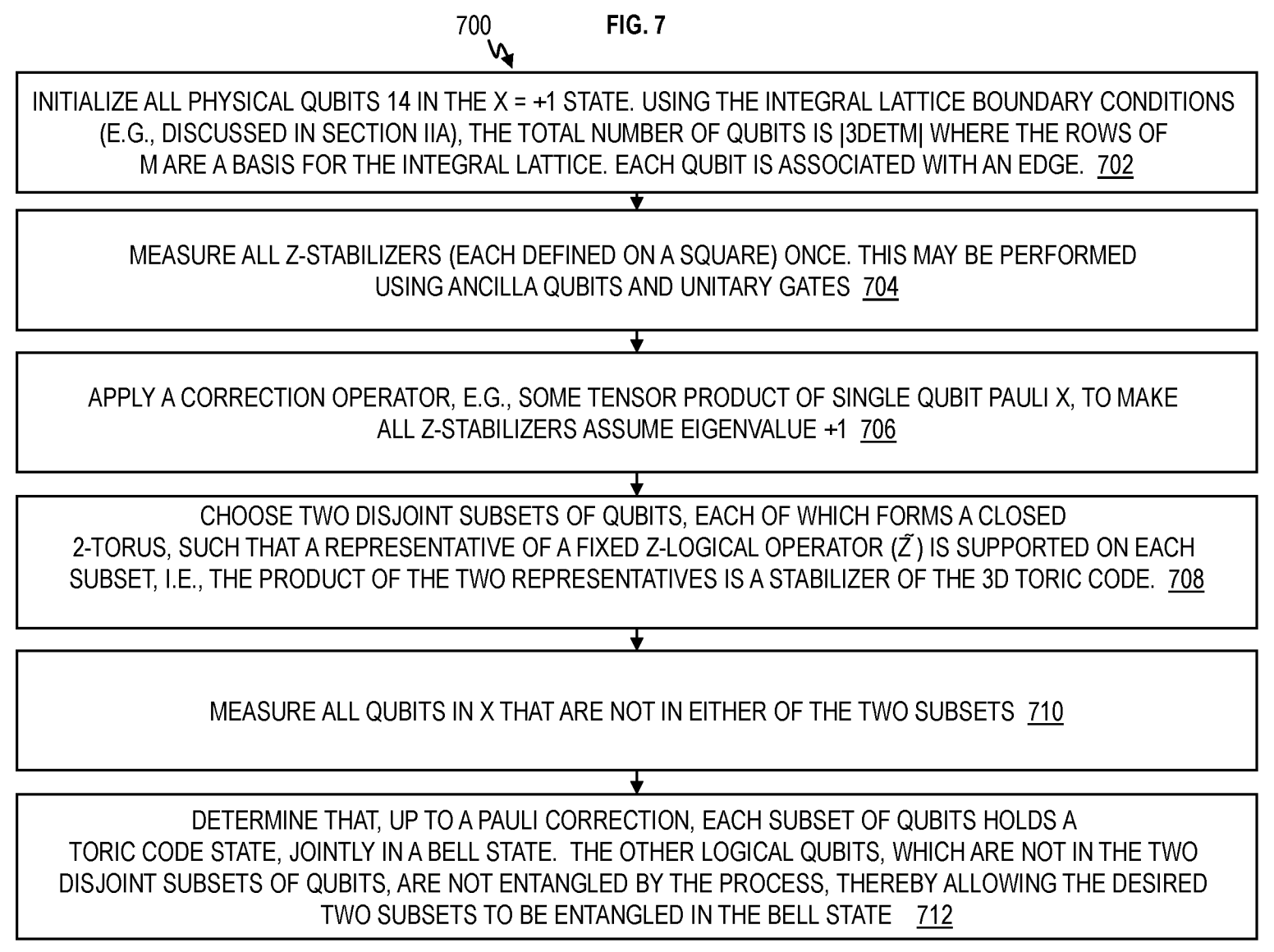

INITIALIZE ALL PHYSICAL QUBITS 14 IN THE X = +1 STATE. USING THE INTEGRAL LATTICE BOUNDARY CONDITIONS (E.G., DISCUSSED IN SECTION IIA), THE TOTAL NUMBER OF QUBITS IS |3DETM| WHERE THE ROWS OF M ARE A BASIS FOR THE INTEGRAL LATTICE. EACH QUBIT IS ASSOCIATED WITH AN EDGE. _702_

MEASURE ALL Z-STABILIZERS (EACH DEFINED ON A SQUARE) ONCE. THIS MAY BE PERFORMED USING ANCILLA QUBITS AND UNITARY GATES _704_

APPLY A CORRECTION OPERATOR, E.G., SOME TENSOR PRODUCT OF SINGLE QUBIT PAULI X, TO MAKE ALL Z-STABILIZERS ASSUME EIGENVALUE +1 _706_

CHOOSE TWO DISJOINT SUBSETS OF QUBITS, EACH OF WHICH FORMS A CLOSED 2-TORUS, SUCH THAT A REPRESENTATIVE OF A FIXED Z-LOGICAL OPERATOR ($\tilde{Z}$) IS SUPPORTED ON EACH SUBSET, I.E., THE PRODUCT OF THE TWO REPRESENTATIVES IS A STABILIZER OF THE 3D TORIC CODE. _708_

MEASURE ALL QUBITS IN X THAT ARE NOT IN EITHER OF THE TWO SUBSETS _710_

DETERMINE THAT, UP TO A PAULI CORRECTION, EACH SUBSET OF QUBITS HOLDS A TORIC CODE STATE, JOINTLY IN A BELL STATE. THE OTHER LOGICAL QUBITS, WHICH ARE NOT IN THE TWO DISJOINT SUBSETS OF QUBITS, ARE NOT ENTANGLED BY THE PROCESS, THEREBY ALLOWING THE DESIRED TWO SUBSETS TO BE ENTANGLED IN THE BELL STATE _712_

TABLE I

| $sys_{1,1}$ | det | $det\,/sys_{1,1}^3$ |
|---|---|---|
| 2 | 2 | 0.25 |
| 3 | 7 | 0.259... |
| 4 | 12 | 0.1875 |
| 5 | 27 | 0.216 |
| 6 | 38 | 0.1759... |
| 7 | 70 | 0.204... |

FIG. 10

TABLE II

| $sys_{1,1}$ | $det$ | $det/sys_{1,1}^3$ |
|---|---|---|
| 2 | 4 | 0.5 |
| 3 | 10 | 0.37... |
| 4 | 16 | 0.25 |
| 5 | 30 | 0.24 |
| 6 | 44 | 0.2037... |
| 7 | 72 | 0.2099... |

FIG. 11

TABLE III

| $sys_{1,1}(L)$ | $det(L)$ | $\dfrac{det(L)}{sys_{1,1}(L)}$ | (2,2) distance | $\dfrac{n}{(2,2)distance^2}$ | comments |
|---|---|---|---|---|---|
| 2 | 2 | $\dfrac{1}{8} = 0.125$ | 2 | 3 | $D_4$ lattice |
| 3 | 9 | $\dfrac{1}{9} = 0.111\ldots$ | 6 | 1.5 | |
| 4 | 16 | $\dfrac{1}{16} = 0.0625$ | 8 | $1.185\ldots$ | |
| 5 | 45 | $\dfrac{45}{55} = 0.072$ | 15 | 1.2 | distance 9 as subsystem code |
| 6 | 68 | $\dfrac{68}{93} = 0.052\ldots$ | | | |
| 7 | 152 | $\dfrac{152}{7^2} = 0.063\ldots$ | | | |

FIG. 12

TABLE IV

TABLE IV. Easily Sliceable Examples

| $sys_{1,1}(L)$ | $det(L)$ |
|---|---|
| 3 | 14 |
| 4 | 24 |
| 5 | 54 |
| 6 | 84 |
| 7 | 166 |

FIG. 13

TABLE V

| effective code distance | 5 | 7 |
|---|---|---|
| Hermite normal form | $\begin{pmatrix} 2 & 0 & 12 \\ & 1 & 8 \\ & & 13 \end{pmatrix}$ | $\begin{pmatrix} 2 & 0 & 12 \\ & 1 & 7 \\ & & 25 \end{pmatrix}$ |

TABLE V. Minimal examples for odd effective code distances for Bell pair generation

Figure 14:
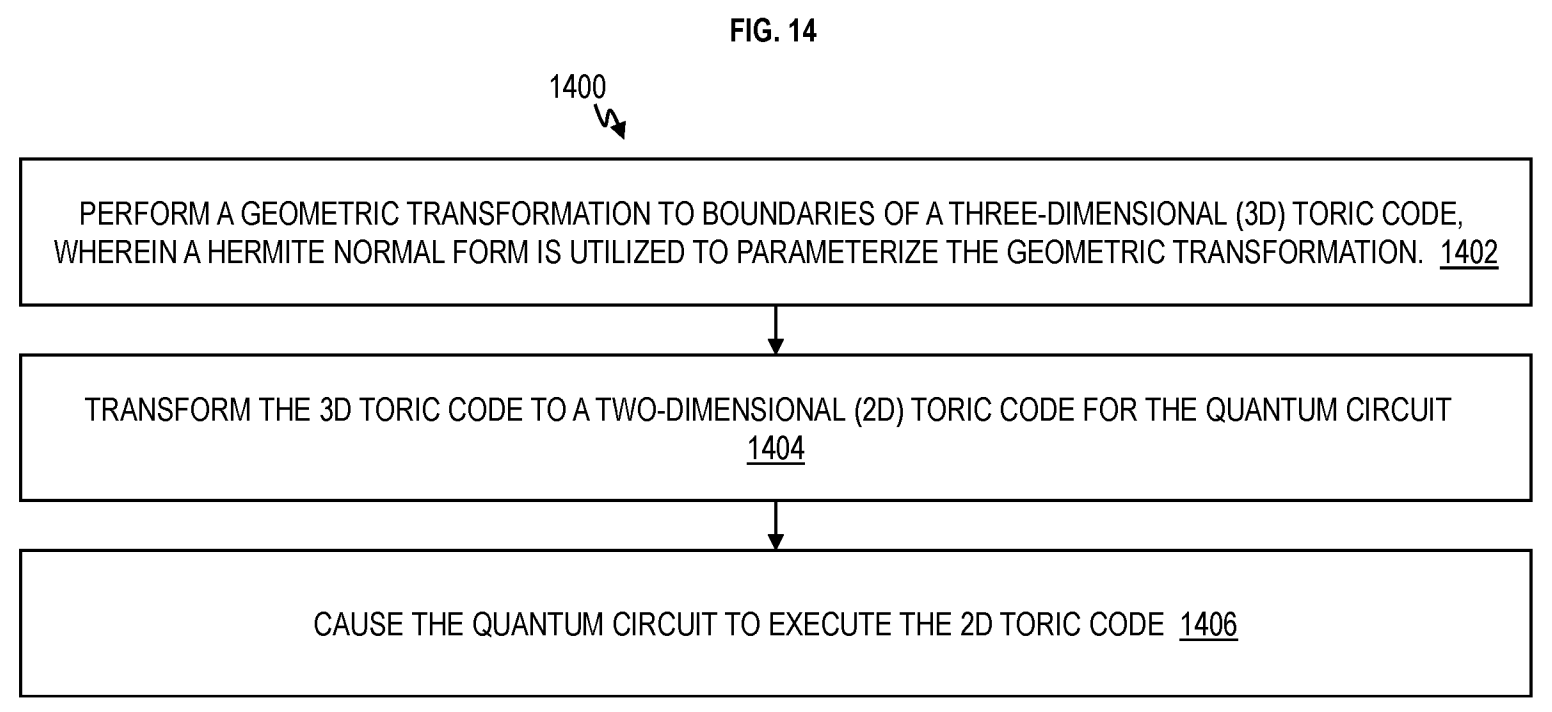

PERFORM A GEOMETRIC TRANSFORMATION TO BOUNDARIES OF A THREE-DIMENSIONAL (3D) TORIC CODE, WHEREIN A HERMITE NORMAL FORM IS UTILIZED TO PARAMETERIZE THE GEOMETRIC TRANSFORMATION.  1402

TRANSFORM THE 3D TORIC CODE TO A TWO-DIMENSIONAL (2D) TORIC CODE FOR THE QUANTUM CIRCUIT  1404

CAUSE THE QUANTUM CIRCUIT TO EXECUTE THE 2D TORIC CODE  1406

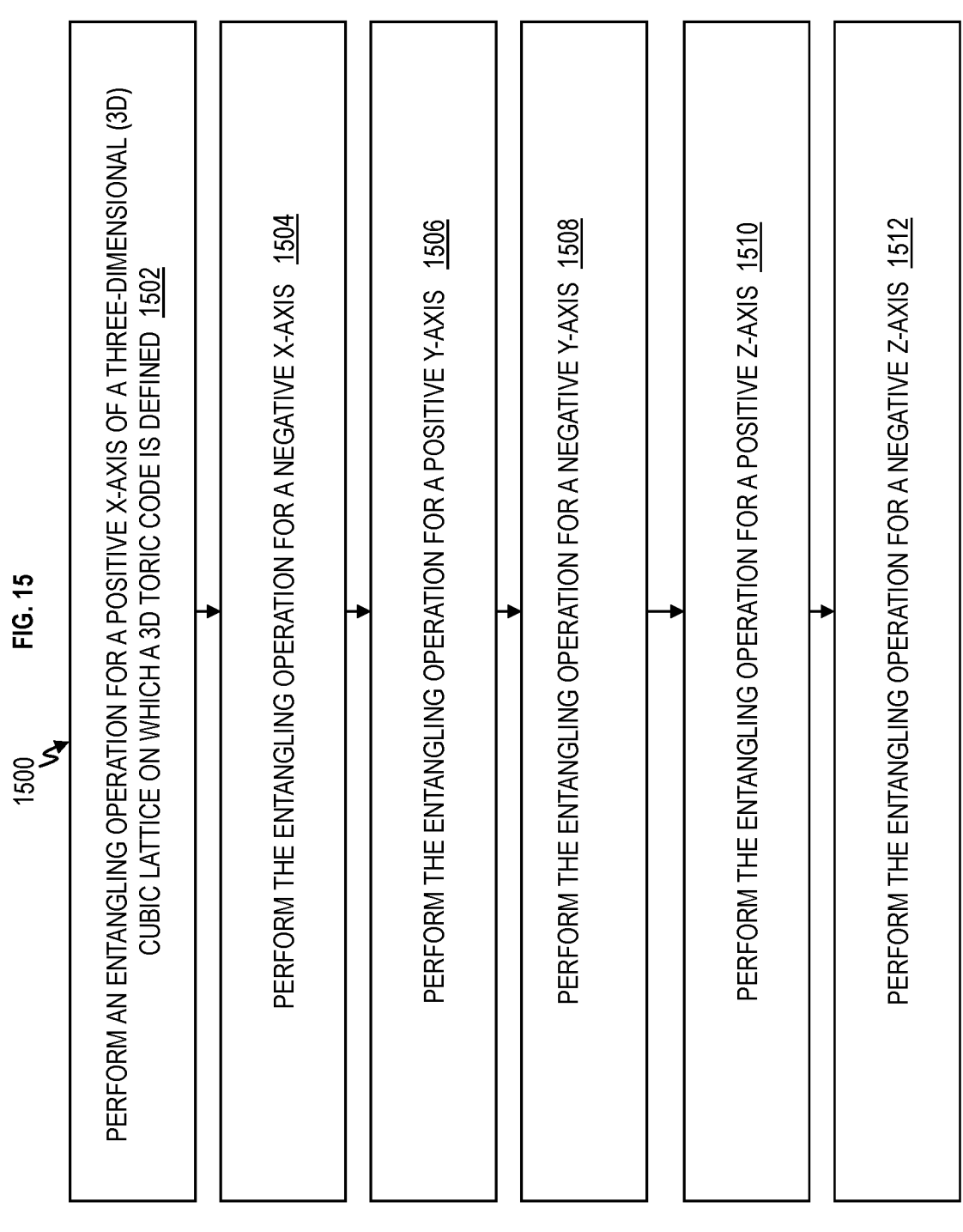

PERFORM AN ENTANGLING OPERATION FOR A POSITIVE X-AXIS OF A THREE-DIMENSIONAL (3D) CUBIC LATTICE ON WHICH A 3D TORIC CODE IS DEFINED  1502

PERFORM THE ENTANGLING OPERATION FOR A NEGATIVE X-AXIS  1504

PERFORM THE ENTANGLING OPERATION FOR A POSITIVE Y-AXIS  1506

PERFORM THE ENTANGLING OPERATION FOR A NEGATIVE Y-AXIS  1508

PERFORM THE ENTANGLING OPERATION FOR A POSITIVE Z-AXIS  1510

PERFORM THE ENTANGLING OPERATION FOR A NEGATIVE Z-AXIS  1512

GEOMETRICALLY ENHANCED CLIFFORD QUANTUM COMPUTER

INTRODUCTION

The subject disclosure relates to quantum circuits, and particularly to a geometrically enhanced Clifford quantum computer.

A quantum computer is a physical machine configured to execute logical operations based on or influenced by quantum-mechanical phenomena. Such logical operations may include, for example, mathematical computation. Current interest in quantum-computer technology is motivated by analysis suggesting that the computational efficiency of an appropriately configured quantum computer may surpass that of any practicable non-quantum computer when applied to certain types of problems. Such problems include computer modeling of natural and synthetic quantum systems, integer factorization, data searching, and function optimization as applied to systems of linear equations and machine learning. Furthermore, it has been predicted that continued miniaturization of conventional computer logic structures will ultimately lead to the development of nanoscale logic components that exhibit quantum effects and should therefore be addressed according to quantum-computing principles.

Different types of quantum computers base their operation on different quantum-mechanical phenomena. A "topological" quantum computer is a quantum computer whose operation is based on a non-Abelian topological phase of matter that may support "braidable" quasiparticles. This type of quantum computer is expected to be less prone to the issue of quantum decoherence than other types of quantum computers, and may therefore serve as a relatively fault-tolerant quantum-computing platform.

SUMMARY

Embodiments of the present invention are directed to methods for providing a geometrically enhanced Clifford quantum computer. A non-limiting computer-implemented method of reducing a qubit count employed by a quantum circuit includes performing a geometric transformation to boundaries of a three-dimensional (3D) toric code, wherein a Hermite normal form is utilized to parameterize the geometric transformation. The method includes transforming the 3D toric code to a two-dimensional (2D) toric code for the quantum circuit and causing the quantum circuit to execute the 2D toric code.

According to one or more embodiments, a non-limiting system having a memory, computer readable instructions for reducing a qubit count employed by a quantum circuit, and one or more processors for executing the computer readable instructions is provided. The computer readable instructions control the one or more processors to perform operations including performing a geometric transformation to boundaries of a three-dimensional (3D) toric code, where a Hermite normal form is utilized to parameterize the geometric transformation. The operations include transforming the 3D toric code to a two-dimensional (2D) toric code for the quantum circuit and causing the quantum circuit to execute the 2D toric code.

According to one or more embodiments, a non-limiting computer-implemented method of reducing error in a quantum circuit includes performing an entangling operation for a positive x-axis of a three-dimensional (3D) cubic lattice on which a 3D toric code is defined. The method includes performing the entangling operation for a negative x-axis, performing the entangling operation for a positive y-axis, performing the entangling operation for a negative y-axis, performing the entangling operation for a positive z-axis, and performing the entangling operation for a negative z-axis.

The above features and advantages, and other features and advantages of the disclosure are readily apparent from the following detailed description when taken in connection with the accompanying drawings. This Summary is provided to introduce in simplified form a selection of concepts that are further described in the Detailed Description. This Summary is not intended to identify key features or essential features of the claimed subject matter, nor is it intended to be used to limit the scope of the claimed subject matter. The claimed subject matter is not limited to implementations that solve any or all disadvantages noted in any part of this disclosure.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 6C depicts a flowchart of a computer-implemented method for twisting/rotating boundary (connectivity) conditions to determine a Pauli stabilizer code defined by the X stabilizer and Z stabilizer in accordance with one or more embodiments;

FIG. 7 depicts a flowchart of a computer-implemented method for creating a logical Bell pair in accordance with one or more embodiments;

FIG. 9 depicts Table I in accordance with one or more embodiments;

FIG. 10 depicts Table II in accordance with one or more embodiments;

FIG. 11 depicts Table III in accordance with one or more embodiments;

FIG. 12 depicts Table IV in accordance with one or more embodiments;

FIG. 13 depicts Table V in accordance with one or more embodiments;

FIG. 14 depicts a flowchart of a computer-implemented method for providing a toric code by modifying boundary conditions to reduce an overall qubit count for a given code distance utilized on a quantum circuit in accordance with one or more embodiments;

FIG. 15 depicts a flowchart of a computer-implemented method for reducing errors in operations performed on a quantum circuit in accordance with one or more embodiments;

The diagrams depicted herein are illustrative. There can be many variations to the diagram or the operations described therein without departing from the spirit of the invention. For instance, the actions can be performed in a differing order or actions can be added, deleted, or modified.

In the accompanying figures and following detailed description of the described embodiments of the invention, the various elements illustrated in the figures are provided with two or three-digit reference numbers. With minor exceptions, the leftmost digit(s) of each reference number corresponds to the figure in which its element is first illustrated.

DETAILED DESCRIPTION

In accordance with one or more embodiments, a system, method, and/or classical computer coupled to a quantum computer are configured and arranged to provide a geometrically enhanced Clifford quantum computer. One or more embodiments provide geometric methods of "rotating" the toric code in higher dimensions to reduce the qubit count. One or more embodiments provide a method that uses the rotating of the toric code for preparing higher dimensional toric code states using single shot techniques, and in turn, using the single shot techniques to prepare entangled logical states such as Bell pairs and/or Greenberger-Horne-Zeilinger (GHZ) states. One or more embodiments provide a generalization to more general stabilizer codes.

The toric code is a topological quantum error correcting code, and an example of a stabilizer code, defined on a two-dimensional spin lattice. The toric code is the simplest and most well studied of the quantum double models. The toric code may be the simplest example of topological order, for example, $Z_2$ topological order. The toric code can also be considered to be a $Z_2$ lattice gauge theory in a particular limit. Topology is the branch of mathematics that studies the properties of objects that do not change under smooth deformations, one classic example being the number of holes in a torus depicted in FIG. 4. In other words, topologists study global properties that are invariant to many local perturbations.

Figure 5:
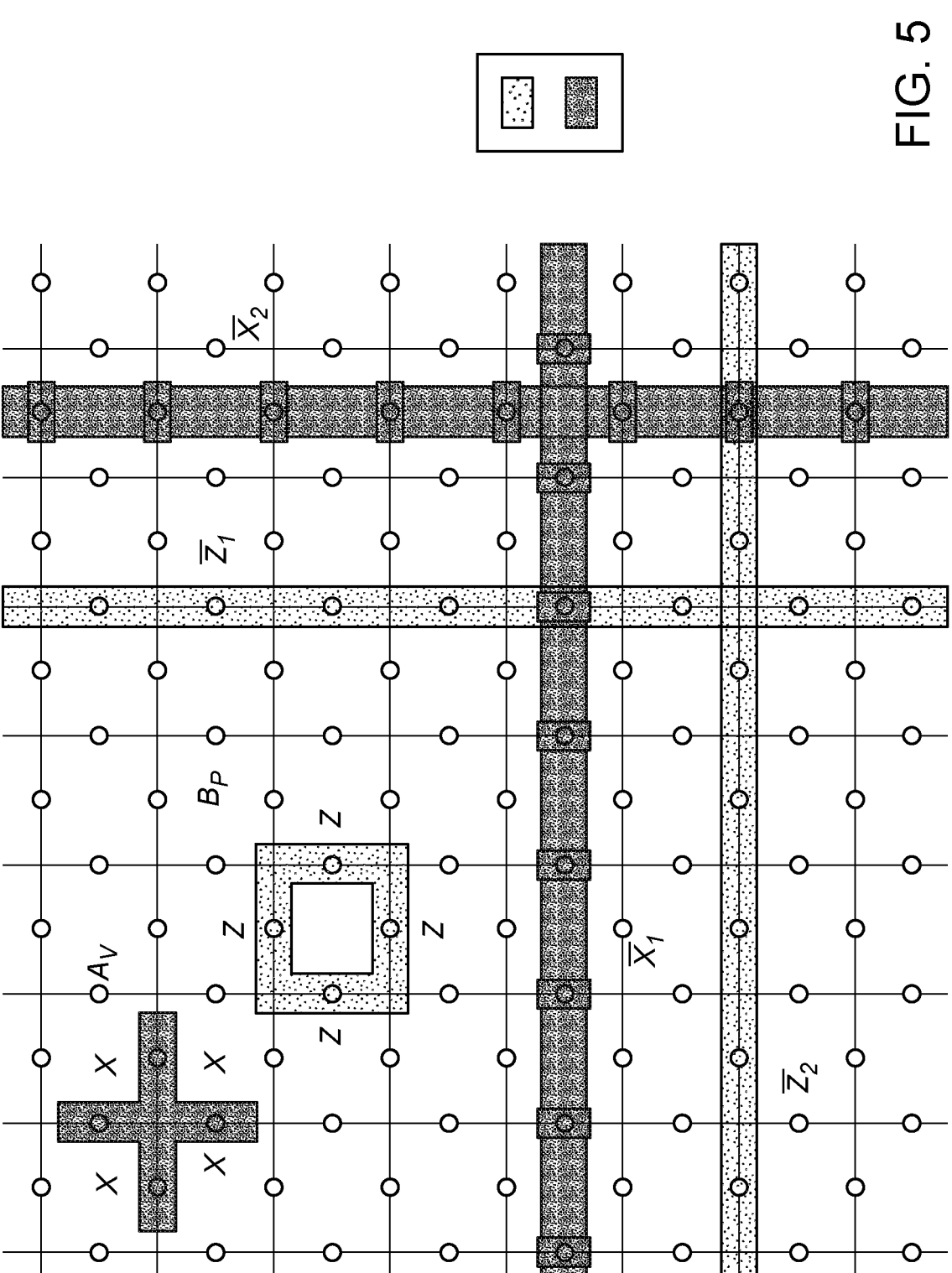
FIG. 5 depicts star operators and plaquette operators for a toric code in accordance with one or more embodiments.

There is a family of Abelian topological Calderbank-Shor-Steane (CSS) stabilizer codes whose generators are few body X-type and Z-type Pauli strings associated to the stars and plaquettes, respectively, of a cellulation of a two-dimensional surface (with a qubit located at each edge of the cellulation). Toric code often either refers to the construction on the two-dimensional torus and/or is an alternative name for the general construction. The construction on surfaces with boundaries is often called the planar code. Codewords correspond to ground states of the surface code Hamiltonian, and error operators create or annihilate pairs of anyonic charges or vortices. As depicted in FIG. 5, the stabilizers of the surface code on the 2-dimensional torus are generated by star operators $A_v$ and plaquette operators $B_p$. Each star operator is a product of four Pauli-X operators on the edges adjacent to a vertex v of the lattice; each plaquette operator is a product of four Pauli-Z operators applied to the edges adjacent to a face, or plaquette p, of the lattice.

The two-dimensional toric code encodes two logical qubits. Denoted by $\overline{X}_i$, $\overline{Z}_i$, are the logical Pauli-X and Pauli-Z operator of the i-th logical qubit. They can be represented by strings of Pauli-X operators or Pauli-Z operators that wrap around the torus as depicted in FIG. 5. Moreover, FIG. 5 depicts stabilizer generators and logical operators of the 2D surface code on a torus. The star operators Ay and the plaquette operators $B_p$ generate the stabilizer group of the toric code. The logical operators are strings that wrap around the torus.

Quantum computing can utilize methods that suppress errors in faulty qubits. Quantum error correction is a broad class of techniques that encode "logical" qubits and gates in a subspace of the Hilbert space formed by many more "physical" qubits and gates. The structure of a quantum code has an influence on how logical gates are enacted on the physical qubits, and hence the total size and execution time of a quantum computation.

Figure 1:
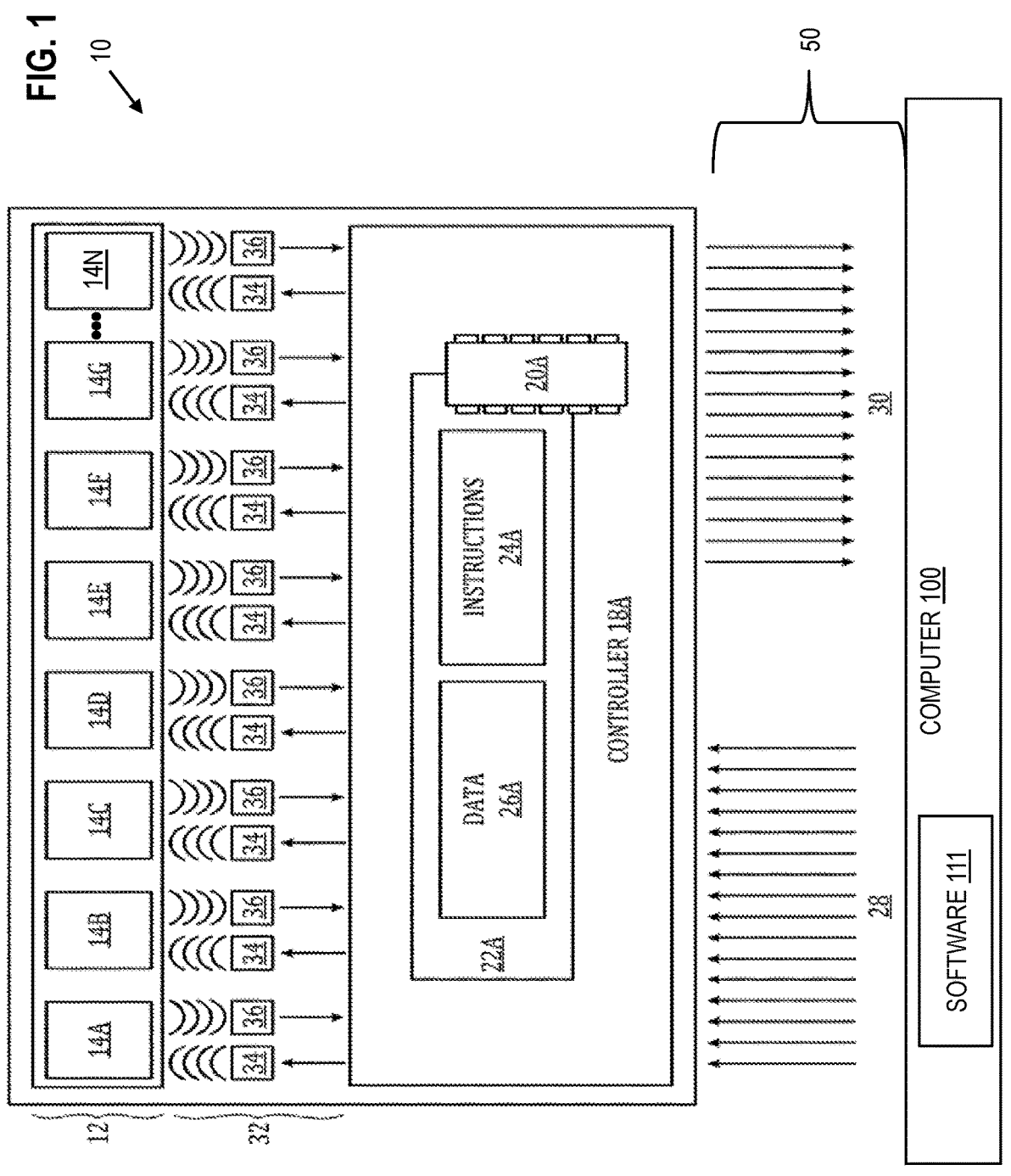
FIG. 1 depicts an example quantum computer configured to execute quantum-logic operations in accordance with one or more embodiments.
Figure 4:
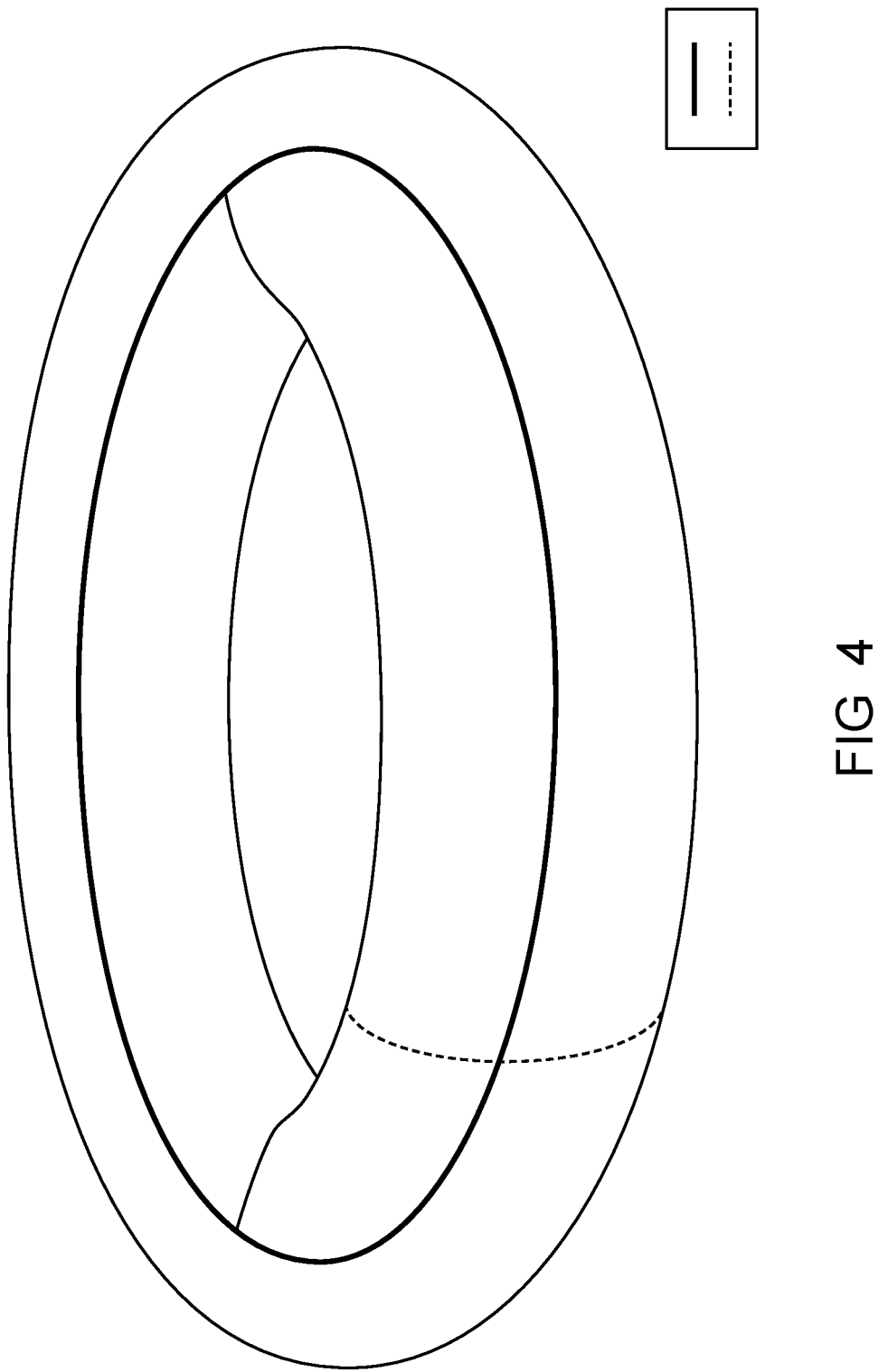
FIG. 4 depicts a torus in accordance with one or more embodiments.

Example Quantum Computer Architecture: FIG. 1 illustrates an example quantum computer 10 configured to execute quantum-logic operations. While conventional computer memory holds digital data in an array of bits and enacts bit-wise logic operations, a quantum computer holds data in an array of qubits and operates quantum-mechanically on the qubits in order to implement the desired logic. Accordingly, quantum computer 10 of FIG. 1 includes at least one quantum circuit 12 having an array of physical qubits 14A, 14B, and 14C-14N, where N is the last number of qubits. The qubits 14A-14N can be referred to collectively as qubits 14. The quantum circuit 12 of the array of qubits 14 can be arranged in a lattice structure as depicted in FIG. 4.

The qubits 14 of the quantum circuit 12 take various forms, depending on the desired architecture of the quantum computer 10. While this disclosure relates to qubits embodied as quasiparticles in a non-Abelian topological phase, a qubit alternatively can include: a superconducting Josephson junction, a trapped ion, a trapped atom coupled to a high-finesse cavity, an atom or molecule confined within a fullerene, an ion or neutral dopant atom confined within a host lattice, a quantum dot exhibiting discrete spatial- or spin-electronic states, electron holes in semiconductor junctions entrained via an electrostatic trap, a coupled quantum-wire pair, an atomic nucleus addressable by magnetic resonance, a free electron in helium, a molecular magnet, or a metal-like carbon nanosphere, as non-limiting examples. More generally, each qubit 14 can include any particle or system of particles that can exist in two or more discrete quantum states that can be measured and manipulated experimentally. For instance, a qubit may be implemented in the plural processing states corresponding to different modes of light propagation through linear optical elements (e.g., mirrors, beam splitters and phase shifters), as well as in states accumulated within a Bose-Einstein condensate.

Figure 2:
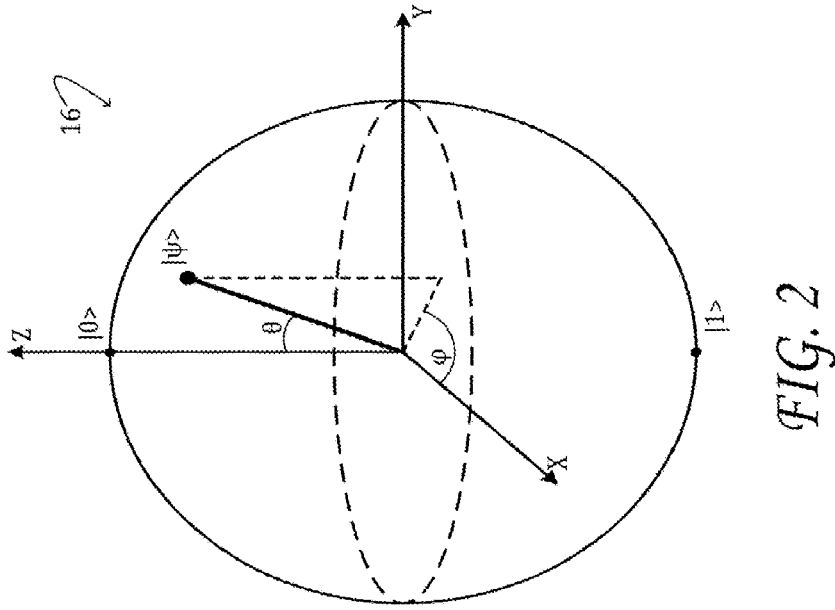
FIG. 2 depicts an illustration of a Bloch sphere that provides a graphical description of some quantum mechanical aspects of an individual qubit in accordance with one or more embodiments.

FIG. 2 is an illustration of a Bloch sphere 16 that provides a graphical description of some quantum mechanical aspects of an individual qubit 14. In this description, the north and south poles of the Bloch sphere correspond to the standard basis vectors |0> and |1>, respectively. The set of points on the surface of the Bloch sphere comprise all possible pure states |ψ> of the qubit, while the interior points correspond to all possible mixed states. A mixed state of a given qubit may result from decoherence, which may occur because of undesirable coupling to external degrees of freedom.

Referring to FIG. 1, quantum computer 10 includes a controller 18A. The controller 18A includes at least one processor 20A and associated computer memory 22A. The processor 20A of the controller 18A can be coupled operatively to peripheral componentry, such as network componentry, to enable the quantum computer to be operated remotely. The processor 20A of the controller 18A can take the form of a central processing unit (CPU), a graphics processing unit (GPU), or the like. As such, the controller can include classical electronic componentry. The terms "classical" and "non-quantum" are applied herein to any component that can be modeled accurately as an ensemble of particles without considering the quantum state of any individual particle. Classical electronic components include integrated, micro-lithographed transistors, resistors, and capacitors, for example. The computer memory 22A can be configured to hold program instructions 24A that cause the processor 20A to execute any function or process of the controller. The computer memory can also be configured to hold additional data 26A. In examples in which quantum circuit 12 is a low-temperature or cryogenic device, the controller 18A can include control componentry operable at low or cryogenic temperatures, for example, a field-programmable gate array (FPGA) operated at 77 kelvin (K). In such examples, the low-temperature control componentry can be coupled operatively to interface componentry operable at normal temperatures.

The controller 18A of the quantum computer 10 is configured to receive a plurality of inputs 28 and to provide a plurality of outputs 30 to classical computer 100. The inputs and outputs can each include digital and/or analog lines in a network 50. At least some of the inputs and outputs can be data lines through which data is provided to and/or extracted from the quantum computer. Other inputs can include control lines via which the operation of the quantum computer can be adjusted or otherwise controlled. In one or more embodiments, the quantum computer 10 can be coupled to a classical computer 100. Further, details of the example computer 100 are discussed in FIG. 8.

The controller 18A is operatively coupled to the quantum circuit 12 via quantum interface 32. The quantum interface 32 is configured to exchange data bidirectionally with the controller 18A. The quantum interface 32 is further configured to exchange signal corresponding to the data bidirectionally with the qubit register. Depending on the architecture of quantum computer 10, such signal may include electrical, magnetic, and/or optical signal. By the signal conveyed through the quantum interface 32, the controller 18A can interrogate and otherwise influence the quantum state held in various qubits 14. For example, the controller 18A can interrogate and otherwise influence the quantum state held a qubit register, as defined by a collective quantum state of a group of qubits 14. The quantum interface 32 includes at least one modulator 34 and at least one demodulator 36, each coupled operatively to one or more qubits 14 of the quantum circuit 12. In one or more embodiments, a modulator 34 and a demodulator 36 can each be coupled to qubits in a qubit register. Each modulator 34 is configured to output a signal to one or more qubits 14 in the quantum circuit 12 based on modulation data received from the controller 18A. In one or more embodiments, at least one modulator 34 can output a signal to qubits in a qubit register based on modulation data received from the controller 18A. Each demodulator 36 is configured to sense a signal from the one or more qubits 14 of the quantum circuit 12 and to output data to the controller 18A based on the signal. In one or more embodiments, each demodulator 36 is configured to sense a signal from the qubit register and to output data to the controller 18A based on the signal. The data received from the demodulator 36 can, in some examples, be an estimate of an observable to the measurement of the quantum state held in one or more qubits 14 in the quantum circuit 12. In one or more embodiments, the data received from the demodulator 36 can be an estimate of an observable to the measurement of the quantum state held in the qubit register.

In some examples, the modulator 34 can transmit a suitably configured signal to interact physically with one or more qubits 14 of the quantum circuit 12 in order to trigger measurement of the quantum state held in one or more qubits 14. The demodulator 36 can then sense a resulting signal released by the one or more qubits 14 pursuant to the measurement and can provide the data corresponding to the resulting signal to the controller 18A. Stated another way, the demodulator 26 is configured to output, based on the signal received, an estimate of one or more observables reflecting the quantum state of one or more qubits of the qubit register, and to furnish the estimate to the controller 18A. In one non-limiting example, the modulator 34 can provide, based on data from the controller 18A, an appropriate voltage pulse or pulse train to an electrode of one or more qubits 14, to initiate a measurement. In short order, the demodulator 36 can sense photon emission from the one or more qubits 14 and can assert a corresponding digital voltage level on a quantum-interface line into the controller 18A. Generally speaking, any measurement of a quantum-mechanical state is defined by the operator "O" corresponding to the observable to be measured; the result "R" of the measurement is guaranteed to be one of the allowed eigenvalues of "O". In the quantum computer 10, "R" is statistically related to the qubit-register state prior to the measurement but is not uniquely determined by the qubit-register state.

Pursuant to appropriate input from the controller 18A, the quantum interface 32 may be configured to implement one or more quantum-logic gates to operate on the quantum state held in the quantum circuit 12, for example, in a qubit register in the quantum circuit 12. While the function of each type of logic gate of a classical computer system is described according to a corresponding truth table, the function of each type of quantum gate is described by a corresponding operator matrix. The operator matrix operates on (i.e., multiplies) the complex vector representing the qubit register state and effects a specified rotation of that vector in Hilbert space.

For example, the Hadamard gate HAD is defined by $$HAD = \frac{1}{\sqrt{2}}\begin{bmatrix} 1 & 1 \\ 1 & -1 \end{bmatrix}. \tag{1}$$

The HAD gate acts on a single qubit; it maps the basis state $$|0\rangle \text{ to } \frac{(|0\rangle)}{\sqrt{2}},$$

and maps to $|1\rangle$ to $(|0\rangle-|1\rangle)\sqrt{2}$. Accordingly, the HAD gate creates a superposition of states that, when measured, have equal probability of revealing $|0\rangle$ or $|1\rangle$.

The phase gate S is defined by $$S = \begin{bmatrix} 1 & 0 \\ 0 & e^{\frac{i\pi}{2}} \end{bmatrix}. \tag{2}$$

The S gate leaves the basis state $|0\rangle$ unchanged but maps $|1\rangle$ to $e^{i\pi/2}|1\rangle$. Accordingly, the probability of measuring either $|0\rangle$ or $|1\rangle$ is unchanged by this gate, but the phase of the quantum state of the qubit is shifted. This is equivalent to rotating $\psi$ by 90 degrees along a circle of latitude on the Bloch sphere of FIG. 2.

Some quantum gates operate on two or more qubits. The SWAP gate, for example, acts on two distinct qubits and swaps their values. This gate is defined by $$SWAP = \begin{bmatrix} 1000 \\ 1010 \\ 0100 \\ 0001 \end{bmatrix}. \tag{3}$$

The foregoing list of quantum gates and associated operator matrices is non-exhaustive, but is provided for ease of illustration. Other quantum gates include Pauli-X, -Y, and -Z gates, the $\sqrt{NOT}$ gate, additional phase-shift gates, the $\sqrt{SWAP}$ gate, controlled cX, cY, and cZ gates, and the Toffoli, Fredkin, Ising, and Deutsch gates, as non-limiting examples.

Figure 3:
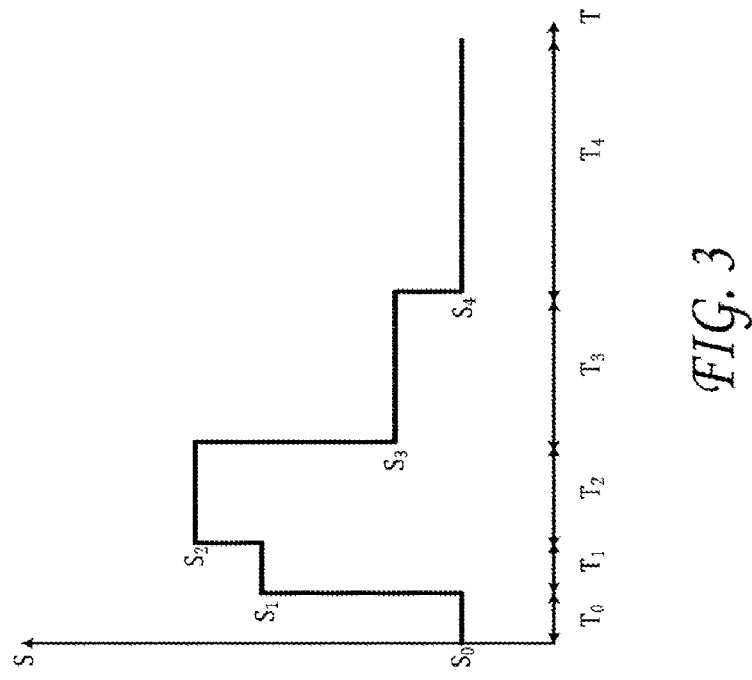
FIG. 3 is a graph of example signal levels associated durations to assert a quantum-gate operation on one or more qubits of a quantum circuit in accordance with one or more embodiments.

Continuing in FIG. 1, suitably configured signal from modulators 34 of the quantum interface 32 can interact physically with one or more qubits 14 of the quantum circuit 12, for example, a qubit register in the quantum circuit 12, so as to assert any desired quantum-gate operation. As noted above, the desired quantum-gate operations are specifically defined rotations of a complex vector representing the qubit register state. In order to effect a desired rotation "O", one or more modulators of quantum interface 32 can apply a predetermined signal level $S_i$ for a predetermined duration $T_i$. In some examples, plural signal levels can be applied for plural sequenced or otherwise associated durations, as depicted in FIG. 3, to assert a quantum-gate operation on one or more qubits of the quantum circuit 12, for example, in a qubit register of the quantum circuit 12. In general, each signal level $S_i$ and each duration $T_i$ is a control parameter adjustable by appropriate programming of controller 18A.

The term 'oracle' is used herein to describe a predetermined sequence of elementary quantum-gate and/or measurement operations executable by quantum computer 10. An oracle can be used to transform the quantum state of qubits 14 in the quantum circuit 12, for example, qubits in a qubit register, to effect a classical or non-elementary quantum-gate operation or to apply a density operator, for example. In some examples, an oracle may be used to enact a predefined 'black-box' operation f(x), which may be incorporated in a complex sequence of operations. To ensure adjoint operation, an oracle mapping n input qubits $|x\rangle$ to m output or ancilla qubits $|y\rangle f(x)$ may be defined as a quantum gate $O(|x\rangle\otimes|y\rangle)$ operating on the n+m qubits. In this case, O can be configured to pass the n input qubits unchanged but combine the result of the operation f(x) with the ancillary qubits via an XOR operation, such that $O(|x\rangle\otimes|t\rangle)=x\rangle\otimes|y+f(x)\rangle$. As described further below, a state-preparation oracle is an oracle configured to generate a quantum state of specified qubit length.

Implicit in the description herein is that each qubit 14 of qubit registers can be interrogated via quantum interface 32 so as to reveal with confidence the standard basis vector $|0\rangle$ or $|1\rangle$ that characterizes the quantum state of that qubit. In some implementations, however, measurement of the quantum state of a physical qubit could be subject to error. Accordingly, any physical qubit 14 can be implemented as a logical qubit, which includes a grouping of physical qubits measured according to an error-correcting oracle that reveals the quantum state of the logical qubit with confidence.

Topological Quantum Computer: In a topological quantum computer, the quantum state held in each qubit is a state of two or more braidable quasiparticles, or "anyons", observed within a non-Abelian topological phase of matter. The world lines of different anyons are quantum mechanically forbidden from intersecting or merging. This feature forces their paths to form stable braids that pass around each other in space-time. Relative to trapped particles used in other types of quantum computers, anyon braids are more resistant to quantum decoherence, which is a source of error in quantum computation. However, the realization of a topological quantum computer has the ability to engineer a suitable topological phase and to manipulate the anyons therein.

Early experiments in topological quantum computing focused on the two-dimensional 'electron gas' of a super-cooled, thin layer of gallium arsenide (GaAs) sandwiched between layers of aluminum gallium arsenide (AlGaAs) and manipulated in a strong magnetic field. Implementation of a quantum computer using that architecture includes the braiding of individual quasiparticle excitations combined with anyonic interferometry-based measurement, involving coherent quasiparticle transport over significant distances.

Proposed more recently is a one-dimensional topological qubit architecture that is more amenable to practical implementation. The proposed system uses a semiconductor-superconductor heterostructure wherein superconductivity, strong spin-orbit coupling, and magnetic fields cooperate to form a topological, superconducting state that supports Majorana zero modes (MZMs). This architecture obviates the need to move quasiparticles by employing a "measurement-only" method wherein a sequence of measurements has the same effect as a braiding operation. This architecture does not require quasiparticles to be moved through an interferometry loop, but rather exploits a distinction between a "fermion parity-protected topological phase" (the actual genus of the proposed heterostructure) and a true topological phase. Advantageously, topological charge in a fermion parity-protected topological phase can be manipulated by the process of electron tunneling into a MZM. Transport through a pair of MZMs can provide a measurement of their combined topological charge in the presence of a large charging energy.

In view of these and other useful properties, MZMs can be used as a basis for the qubits of a topological quantum computer. The MZMs are created at the ends of semiconductor-superconductor heterostructures tuned into a topological regime by the appropriate magnetic field and gate voltages. A series of practical implementations are described in Karzig et al., *Scalable Designs for Quasiparticle-Poisoning-Protected Topological Quantum Computation with Majorana Zero Modes*, arXiv: 1610.05289v4 [cond-mat.mes-hall] 21 Jun. 2017. Suitable heterostructure materials and material properties are described in Lutchyn et al., *Majorana Fermions and a Topological Phase Transition in Semiconductor-Superconductor Heterostructures*, arXiv: 1002.4033v2 [cond-mat.supr-con] 13 Aug. 2010. The entirety of both of the above references is hereby incorporated by reference herein, for all purposes.

The toric code and other codes are implemented in the instructions 24A in the quantum computer 10. In one or more embodiments, the toric code and other codes can be implemented as computer-executable instructions in the classical computer 100 and sent to the quantum computer 10 for execution. As understood by one of ordinary skill in the art, the toric code and other codes denote techniques of operating the 2D array of qubits 14 in the quantum circuit 12. In particular, the toric code is measurement and operations code for logical qubits, and the measurements and operations can be performed using stars and plaquettes. The toric code is based on a two-dimensional spin lattice. As noted herein, the instructions 24A cause measurements and operations on the quantum circuit 12 using the modulators 34 and demodulators 36. A measurement of and operation on one or more physical qubits 14 are the result of sending a signal via the modulator 34 and receiving a signal back via the demodulator 36. The received signal, also referred to as the measurements, has the quantum information about the logical qubit that is formed of two or more physical qubits 14. Based on a signal sent and the received signal from the quantum circuit 12, a logical qubit is formed of two or more physical qubits 14 as understood by one of ordinary skill in the art. The various signals sent and corresponding signals received back can be performed using the toric code, as understood by one of ordinary skill in the art. The toric code can be modified for the specifics of different hardware.

Figures 6A, 6B:
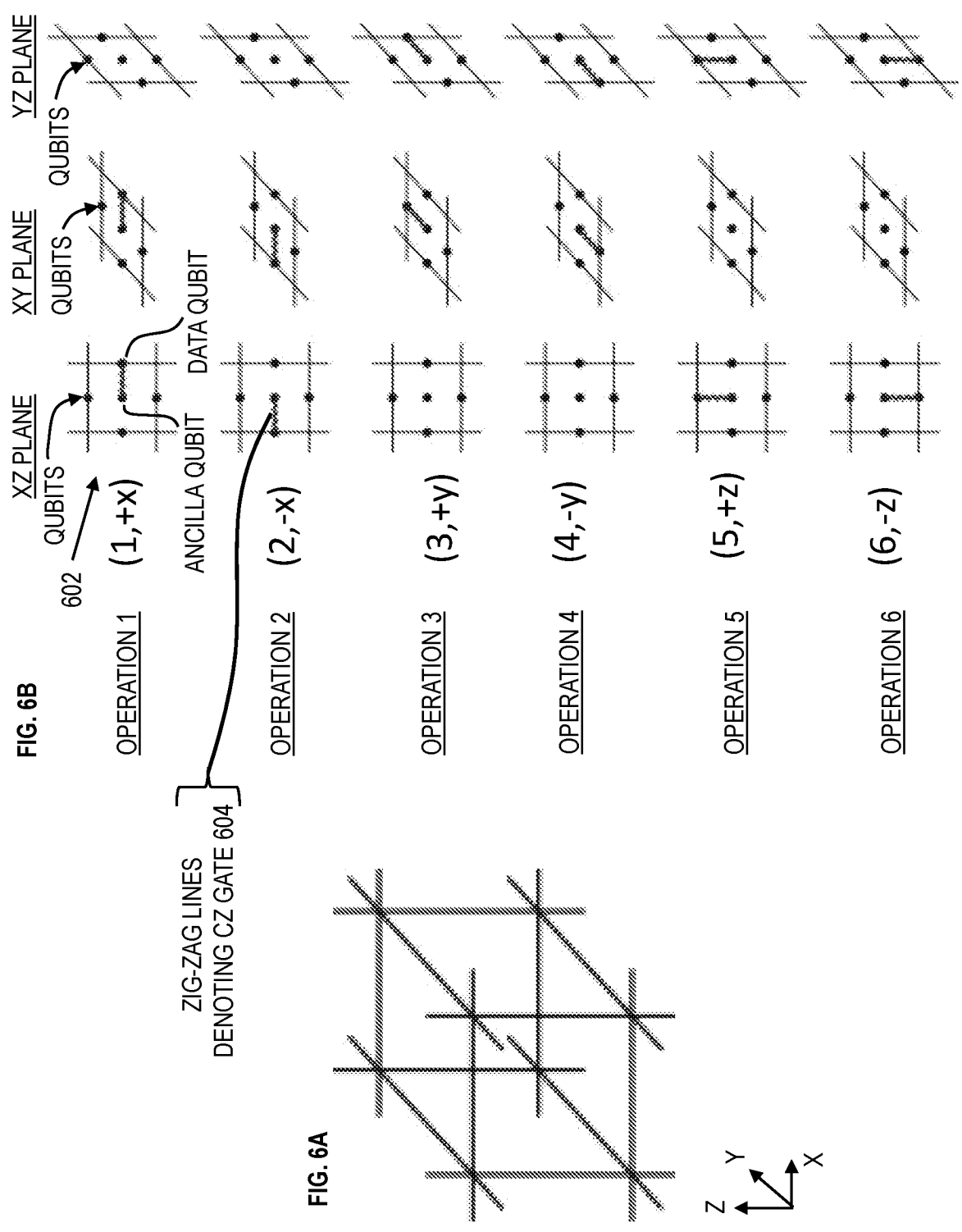
FIG. 6A depicts an example of a 3D cubic lattice in accordance with one or more embodiments.
FIG. 6B depicts each type of plaquette appearing in the 3D cubic lattice in accordance with one or more embodiments.

FIG. 6A depicts an example of a 3D cubic lattice for toric code. In FIG. 6A, the qubits reside on the edges and plaquettes (faces) of the lattice. FIG. 6B depicts each type of plaquette 602 appearing in the cubic lattice. The qubits are denoted by black dots. FIG. 6B depicts an order for measuring Z stabilizers in a 3D cubic lattice according to one or more embodiments. In FIG. 6B, this ordering of operations 1, 2, 3, 4, 5, and 6 can be referred to as the "starfish" as discussed further herein in Section II. At each operation 1-6, the software 111 is configured to cause operation of (apply) a CZ gate, denoted by the zig-zag line 604, from an ancilla qubit at the plaquette center to a data qubit at the edge center, by providing the inputs 28 to cause execution on the qubits 14 of the quantum computer 10. The circuit depth is 6 as indicated by the 6 operations. In some cases, the directions of x, y, and z can be referred to as directions 1, 2, and 3 in other examples. Although CZ gates are utilized, in one or more embodiments CNOT gates can be applied.

FIG. 6C depicts a flowchart of a computer-implemented method 600 for twisting/rotating boundary (connectivity) conditions to determine a Pauli stabilizer code defined by the X stabilizer and Z stabilizer according to one or more embodiments. When executing the computer-implemented method 600, the software 111 of the computer 100 provides the inputs 28 to cause execution on the qubits 14 of the quantum computer 10 in accordance with the computer-implemented method 600, which causes the outputs 30 from the quantum computer 10.

At block 620, the software 111 of computer 100 is configured to, given an integral matrix M in the Hermite normal form, determine a set of lattice points that uniquely represent points in the quotient group $T=Z^3/(\text{span of rows of } M)$. This set of lattice points labels the vertices of T.

At block 622, the software 111 is configured to assign a qubit (e.g., a logical qubit formed on qubits 14) on each edge of T; an edge is a tuple ([p], [p+t]) of two vertices of T where t is a unit vector along x, y, or z direction, and where [p] and [p+t] denote a vertex of T, whose representation is determine by block 620. The boundary of an edge is two points [p] and [p+t].

At block 624, the software 111 is configured to, for each vertex v of T, define an X-stabilizer that is a tensor product of six Pauli X's on the edges that have a common vertex v in their boundary.

At block 626, the software 111 is configured to, for each square of T (e.g., $T^2$), which is a tuple of four consecutively boundary-sharing edges, define a Z-stabilizer that is a tensor product of four Pauli Z's on the edges of the boundary of the square.

At block 628, the software 111 is configured to define a Pauli stabilizer code by the X-stabilizers and Z-stabilizers and cause the Pauli stabilizer code to be applied as the inputs 28 on the quantum computer 10.

Turning now to FIG. 14, a flowchart is depicted of a computer-implemented method 1400 for providing a 2D toric code by modifying boundary conditions to reduce an overall qubit count for a given code distance utilized on the quantum circuit 12 according to one or more embodiments. Further reference can be made to Section II discussed herein. When executing the computer-implemented method 1400, the software 111 of the computer 100 provides the inputs 28 to cause execution on the qubits 14 of the quantum computer 10 in accordance with the computer-implemented method 1400, which causes the outputs 30 from the quantum computer 10.

Figure 16:
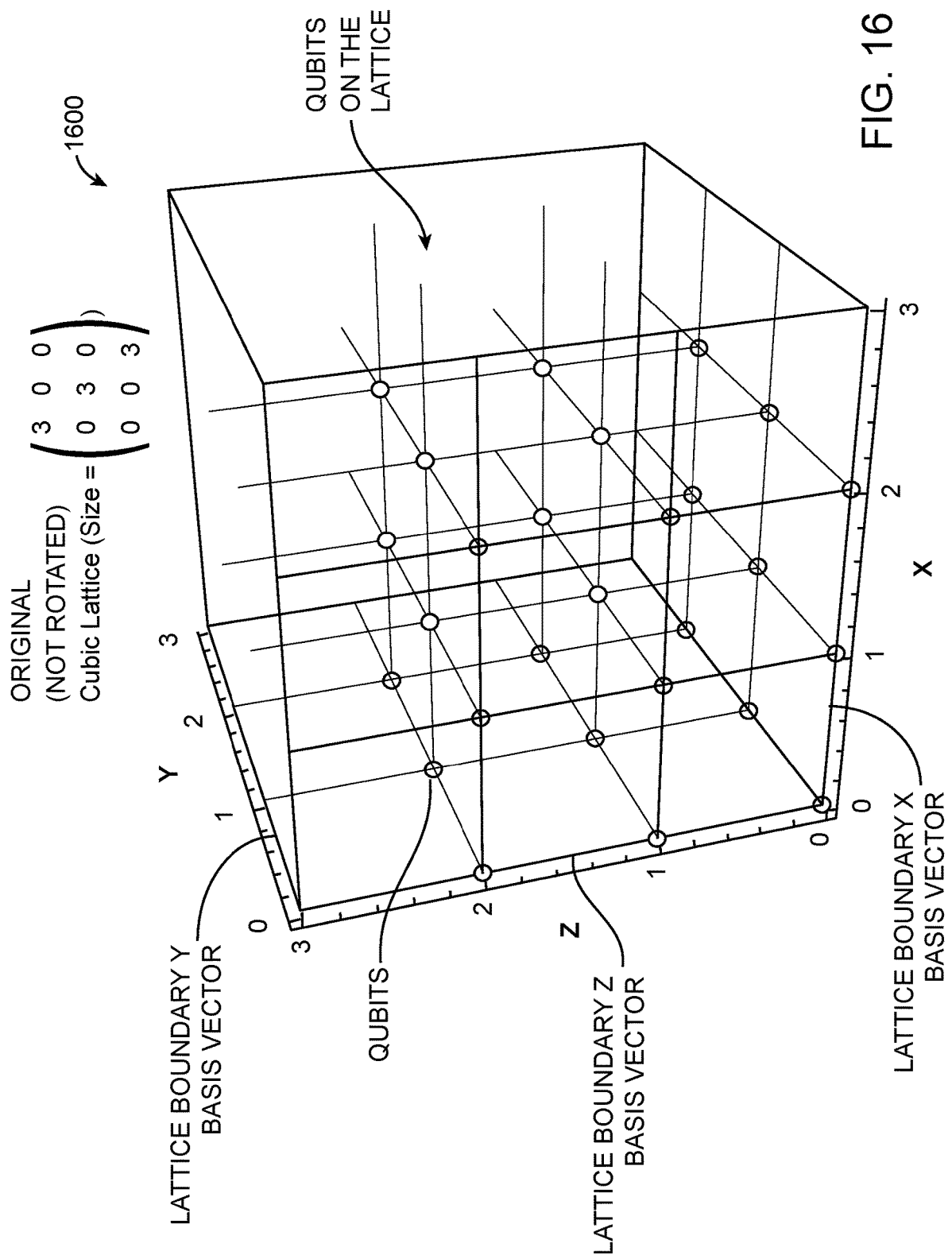
FIG. 16 depicts a block diagram of an example cubic lattice of qubits with a lattice boundary X basis vector, a lattice boundary Y basis vector, and a lattice boundary Z basis vector in accordance with one or more embodiments.
Figure 17:
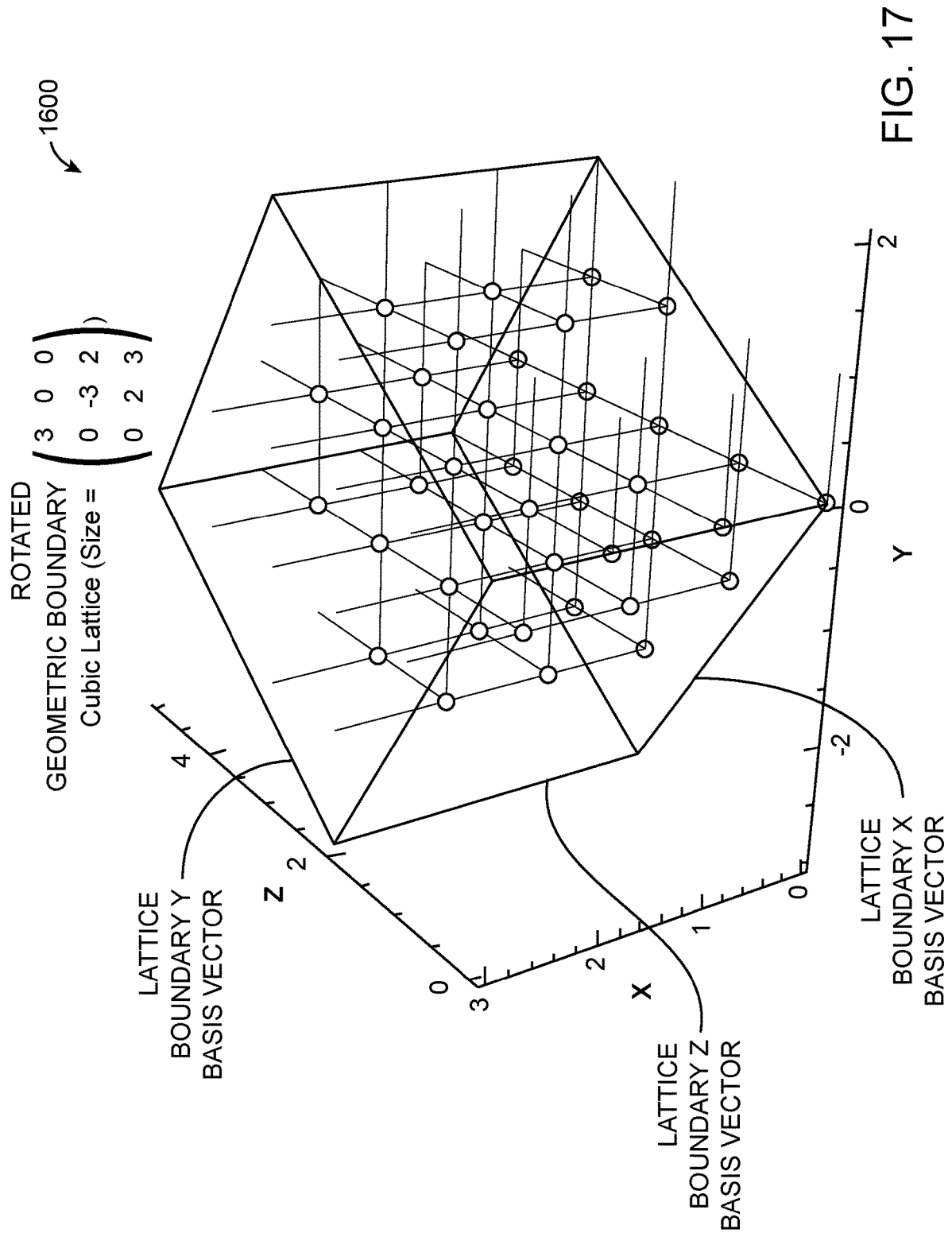
FIG. 17 depicts a block diagram of the example cubic lattice of qubits after undergoing geometric transformation/rotation to the lattice boundary X basis vector, the lattice boundary Y basis vector, and the lattice boundary Z basis vector in accordance with one or more embodiments.

At block 1402, the software 111 of the computer system 100 is configured to perform a geometric (shear) transformation/rotation to boundaries of a three-dimensional (3D) toric code, where a Hermite normal form is utilized to parameterize the geometric (shear) transformation/rotation. FIG. 16 depicts a block diagram of an example cubic lattice 1600 of qubits with a lattice boundary X basis vector, a lattice boundary Y basis vector, and a lattice boundary Z basis vector. As seen in FIG. 16, the boundaries of the cubic lattice of qubits have not undergone geometric transformation/rotation and are in their original state. In FIG. 16, the x, y, and z axes are respectively aligned to the lattice boundary X basis vector, the lattice boundary Y basis vector, and the lattice boundary Z basis vector of the cubic lattice 1600 of qubits. In contrast, FIG. 17 depicts a block diagram of the cubic lattice 1600 of qubits after undergoing geometric transformation/rotation. As can be seen in FIG. 17, the boundaries of the lattice boundary X basis vector, the lattice boundary Y basis vector, and the lattice boundary Z basis vector of the cubic lattice 1600 of qubits have been rotated from their original positions.

At block 1404, the software 111 is configured to transform the 3D toric code to a two-dimensional (2D) toric code for operation on the quantum circuit 12. A suitable technique can be utilized to transform the 3D toric code to a 2D toric code as understood by one of ordinary skill in the art.

At block 1406, the software 111 is configured to cause the quantum circuit 12 to execute the 2D toric code. For example, the software 111 of the computer 100 provides the inputs 28 to cause execution of the 2D toric code on the qubits 14 of the quantum computer 10, which causes the outputs 30 from the quantum computer 10.

In one or more embodiments, a state of the 3D toric code is sliced to generate/encode a Bell pair across two logical qubits in the 2D toric code. The 2D toric code includes a grouping of two or more physical qubits 14 into a single logical qubit, such that operations are performed on the logical qubits.

The Hermite normal form is chosen to be sliceable based at least in part on even numbers on a diagonal of the Hermite normal form. The geometric (shear) transformation/rotation comprises rotating the boundaries of the 3D toric code, such as the boundaries formed by the lattice boundary X basis vector, the lattice boundary Y basis vector, and the lattice boundary Z basis vector. The Hermite normal form is chosen to be sliceable based at least in part on a composite determinant of the Hermite normal form. Further, a state of the 3D toric code is sliced to generate/encode a Greenberger-Horne-Zeilinger (GHZ) state across multiple logical qubits in the 2D toric code. The Hermite normal form is a matrix. Lattices of the 3D toric code are sliceable into the 2D toric code by determining that the Hermite normal is a matrix having a value of a lower diagonal greater than 1 and by measuring out a subset of logical qubits of the quantum circuit. The 2D toric code encodes physical qubits of the quantum circuit into logical qubits such that quantum operations are performed on the logical qubits.

Turning now to FIG. 15, a flowchart is depicted of a computer-implemented method 1500 for reducing errors in operations performed on a quantum circuit according to one or more embodiments. Further reference can be made to FIG. 6B and Section II discussed herein. When executing the computer-implemented method 1500, the software 111 of the computer 100 provides the inputs 28 to cause execution on the qubits 14 of the quantum computer 10 in accordance with the computer-implemented method 1500, which causes the outputs 30 from the quantum computer 10.

In the computer-implemented method 1500, the software 111 of computer system 100 is configured to cause on the quantum circuit 12 an entangling operation for a positive x-axis of a three-dimensional (3D) cubic lattice on which a 3D toric code is defined at block 1502, cause on the quantum circuit 12 the entangling operation for a negative x-axis at block 1504, cause on the quantum circuit 12 the entangling operation for a positive y-axis at block 1506, cause on the quantum circuit 12 the entangling operation for a negative y-axis at block 1508, cause on the quantum circuit 12 the entangling operation for a positive z-axis at block 1510, and cause on the quantum circuit 12 the entangling operation for a negative z-axis at block 1512.

In one or more embodiments, the entangling operation comprises a controlled NOT (CNOT) gate operation or a controlled Z (CZ) gate operation. Execution of the entangling operation is between an ancilla qubit and a data qubit, such that any error on the ancilla qubit propagates for detection to on the data qubit as depicted in FIGS. 6A and 6B. An ordering of the entangling operation for the positive and negative x-axes, y-axes, and z-axes has an effect that reduces a propagation of errors on the quantum circuit.

Headings and subheadings are presented in the descriptions for ease of understanding and to assist the reader. The use of headings and subheading is not meant to be limiting, and it should be appreciated that the descriptions presented under headings can be integrated with the descriptions presented under other headings. Various experiments and simulations may be discussed for explanation purposes, and one or more embodiments are not meant to be limited to exact details disclosed in the experiments and simulations.

I. Introduction

Almost all proposed architectures for a quantum computer rely on first implementing Clifford operations in a fault tolerant fashion, and then using some methods (such as magic state distillation) to implement non-Clifford operations on top. The standard methods for implementing these Clifford operations are to use some stabilizer code (e.g., the surface code, but other codes are also proposed) to encode qubits and protect them against error, and then implement logical operations between these stabilizer codes by various methods such as, for example, transversal controlled NOT (CNOT) gates, lattice surgery, and/or other methods.

The inventors disclose a more direct architecture. Using the software 111, the inventors create stabilizer states by preparing all physical qubits 14 in some product state and then measuring stabilizers of some code which admits single shot error correction. Then, the software 111 is configured to "slice" these stabilizer states by measuring out some subset of the physical qubits 14. The slicing of the stabilizer states is done in such a way that the remaining qubits 14 form some number, $n_{slice} \geq 1$, of distinct stabilizer codes, with entanglement between the logical qubits of these codes. This gives a direct route to produce several stabilizer codes, whose logical qubits are themselves in some entangled stabilizer state. In an example case analyzed below, the inventors use software 111 to slice a three-dimensional (3D) toric code into several 2D toric codes, allowing one to produce a Bell pair and/or higher GHZ state in the quantum computer 10. In addition, the inventors disclose a prescription to produce arbitrary encoded stabilizer states in Section IV. In Section V, the inventors explain how to build a Clifford computer from this. A quantum computer that can implement Clifford operations can be called a Clifford computer such as the quantum computer 10.

This method bears some relation to measurement-based quantum computing. However, the inventors disclose novel methods for creating entangled logical states. Further, the inventors disclose a method to reduce qubit count significantly by exploiting geometry. For example, one or more embodiments rotate the boundary conditions of the 3D toric code to reduce the qubit count for the given code distance, as explained in Section II. This is a special case of the more general method in Section IV.

II. A Method to Produce Geometric Codes with Enhanced Code Performance

One or more embodiments disclose a method to produce codes with enhanced performance by leveraging geometry. In the following subsections, the inventors analyze the simple 3D and 4D examples that come from taking a 3D or 4D toric code, and modifying the boundary conditions so that the toric code reduces the overall qubit count for a given code distance.

A. Rotated Toric Code and Hermite Normal Form

The inventors consider a standard n-dimensional toric code: take the simple (hyper) cubic lattice, and put qubits on cells of a fixed dimension, X-checks on one lower dimensional cells, and Z-checks on one higher dimensional cells. It is assumed that there is an integral lattice $\Lambda$, and a subgroup of the abelian group $R''$ under addition where each element of $\Lambda$ has integral coordinates. The inventors take the toric code on $R''/\Lambda$, with degrees of freedom on edges (i.e., 1-cells). If M is a matrix containing basis vectors of $\Lambda$ in its rows, then the volume vol $(R''/\Lambda)$ is equal to |detM|, and the total number of qubits is the product of this volume of the torus and the number of qubits per unit hypercube. For this (1,n−1)-toric code, the code distance is given by the $\ell_1$ 1-systole. That is, it is the minimum $\ell 1$ norm of a nonzero vector in the lattice. The inventors denote this by $sys_{1,1}$, with the subscripts indicating that this is the 1-systole computed using the $\ell_1$ norm.

It is often convenient to bring M to so-called Hermite normal form, by left multiplying by a unimodular matrix which leaves the lattice invariant. In this form, M is an upper triangular matrix. Provided is the following:

$$i < j \Rightarrow 0 \le M_{ij} < M_{jj}. \qquad \text{(Eq. 1)}$$

In Eq. 1, i is the number of rows and j is the number of columns. These conditions define the Hermite normal form. This form has two advantages in one or more embodiments. For one, Hermite normal form simplifies a computer search for lattices with a minimum determinant for the given $\ell_1$ systole, as the determinant can be immediately calculated in this form (being simply the product of diagonal entries). Second, in the construction of "easily sliceable" codes below (see Section III B) in accordance with one or more embodiments, the software 111 can immediately read off whether a given 3D toric code can be "sliced" into two or more 2D toric codes by examining the upper left diagonal entry of the Hermite normal form. When the upper left entry is equal to some integer $n_{slice} > 1$, the software 111 can divide the qubits of the toric code into $n_{slice}$ disjoint sets, and label the directions of space 1,2,3 corresponding to the three columns of the matrix in Hermite normal form. One set of qubits are those corresponding to edges pointing in direction 1. Once these qubits are measured in the X-basis (see section III B), the vertex stabilizers of the 3D toric code become vertex stabilizers of $n_{slice}$ distinct 2D toric codes. It is noted that, depending on the measurement outcome, there may of course be some sign in front of the vertex stabilizers of the 2D toric code, but the inventors continue to refer to the vertex stabilizers having the sign in front as a 2D toric code state because it is the same up to a Pauli frame change. Each of these 2D toric codes corresponds to one of the $n_{slice}$ possible choices of the first coordinate in the 3D geometry.

B. Examples in Three Dimensions

The inventors give some minimal examples in three dimensions, i.e., the minimal possible determinant for a given $\ell_1$ systole. Every example generates a family of examples: for any integer $\ell \ge 1$ one may multiply all entries of the matrix M by $\ell$, increasing the $\ell_1$ systole by a factor of $\ell$ and increasing the determinant by a factor of $\ell^3$.

The results are summarized in Table I of FIG. 9, if the inventors do not require that it be easily sliceable, and in Table II of FIG. 10 when the inventors require $n_{slice} \ge 2$. In fact, in every case, the minimal determinant was found with the minimal number of slices; i.e., for a given $\ell_1$ systole, the minimum determinant with no requirement on $n_{slice}$ was found with $n_{slice}=1$ and the minimum determinant requiring $n_{slice} \ge 2$ was found with $n_{slice}=2$.

In FIG. 9, the Table I illustrates parameters for codes without requiring that it be easily sliceable. The first column is the $\ell_1$ systole, the second column is the determinant of the lattice, and the third column is the ratio of the determinant to the cube of the $\ell_1$ systole.

Additional examples are given for odd distances in Hermite normal form without requiring that it be easily sliceable. For $\ell_1$ systole equal to 3, a minimal example has Hermite normal form as expressed below.

$$\begin{pmatrix} 1 & 0 & 4 \\ & 1 & 5 \\ & & 7 \end{pmatrix} \qquad \text{(Eq. 2)}$$

For $\ell_1$ systole equal to 5, a minimal example has Hermite normal form as expressed below.

$$\begin{pmatrix} 1 & 0 & 17 \\ & 1 & 23 \\ & & 27 \end{pmatrix} \qquad \text{(Eq. 3)}$$

For $\ell_1$ systole equal to 7, a minimal example has Hermite normal form as expressed below.

$$\begin{pmatrix} 1 & 0 & 45 \\ & 1 & 54 \\ & & 70 \end{pmatrix} \qquad \text{(Eq. 4)}$$

FIG. 10 depicts Table II illustrating parameters for codes with $n_{slice} \ge 2$. The first column is the $\ell_1$ systole, the second column is the determinant of the lattice, and the third column is the ratio of the determinant to the cube of the $\ell_1$ systole.

Examples are now given for odd distances in Hermite normal form with $n_{slice}=2$. For $\ell_1$ systole equal to 3, and a minimal example has Hermite normal form as expressed below.

$$\begin{pmatrix} 2 & 0 & 4 \\ & 1 & 3 \\ & & 5 \end{pmatrix} \qquad \text{(Eq. 5)}$$

For $\ell_1$ systole equal to 5, a minimal example has Hermite normal form as expressed below.

$$\begin{pmatrix} 2 & 0 & 9 \\ & 1 & 11 \\ & & 15 \end{pmatrix} \qquad \text{(Eq. 6)}$$

For $\ell_1$ systole equal to 7, a minimal example has Hermite normal form as expressed below.

$$\begin{pmatrix} 2 & 1 & 5 \\ & 3 & 8 \\ & & 12 \end{pmatrix} \qquad \text{(Eq. 7)}$$

C. Four and Higher Dimensions

In four dimensions, in this subsection the inventors again consider toric codes on hypercubic lattices. Now, two different codes are considered, either a (1,3) toric code or a (2,2) toric code. In the (2,2) toric code on a hypercubic lattice, stabilizers have weight 6. In Appendix B, the inventors evaluate other cellulations of a four-torus to reduce stabilizer weight.

A numerical search (see Appendix C1 for details) gives the following results for the optimal det for given $sys_{1,1}$.

In Appendix C2, the inventors discuss the performance of these codes as quantum memories for the noneasily-sliceable examples and discuss possible advantages of these over other codes.

First, without requiring that it is easily sliceable, attention is drawn to Table III in FIG. 11. Table III illustrates parameters for various codes. The ratio $$\frac{n}{(2,\,2)\text{distance}^2}$$

is the ratio of number of qubits to code distance squared. For the det=16 code in Table III, the inventors have used 9 for the distance, in the case that this is treated as a subsystem code.

The inventors will proceed through the examples one-by-one. In Table III in FIG. 11, the column det(L) gives the minimum possible determinant for the given $\text{sys}_{1,1}(L)$ for the given lattice L. In some cases, as discussed below, the lattice with that det(L) and $\text{sys}_{1,1}(L)$ is unique up to various symmetries.

The column (2,2) distance gives the distance of these examples as a (2,2) toric code. In some, but not all, of the cases where the lattice is not unique, the inventors have checked the (2,2) distance of some other lattices with the given $\text{sys}_{1,1}(L)$ and det(L) and found that the (2,2) distance of the other lattices is not as large as in the example here. However, it should be understood that the inventors have not performed an exhaustive search to optimize the (2,2) distance for the given det(L).

For $\text{sys}_{1,1}=2$, the optimal example has Hermite normal form $$\begin{pmatrix} 1 & 0 & 0 & 1 \\ 0 & 1 & 0 & 1 \\ 0 & 0 & 1 & 1 \\ 0 & 0 & 0 & 2 \end{pmatrix}.$$

This gives the so-called $D_4$ lattice. It is the lattice of points with integer coordinates such that the sum of all coordinates is even.

For $\text{sys}_{1,1}=3$, an optimal example has Hermite normal form $$\begin{pmatrix} 1 & 0 & 0 & 5 \\ 0 & 1 & 0 & 6 \\ 0 & 0 & 1 & 7 \\ 0 & 0 & 0 & 9 \end{pmatrix}.$$

Among the lattices with $\text{sys}_{1,1}(L)=3$ and det(L)=9, with the given entries on the diagonal of the Hermite normal form, this example is unique up to a permutation of rows and columns and up to changing the sign of the three off-diagonal elements in the last column mod 9. That is, the inventors can make any of the exchanges 5↔−5=4 mod 9, 6↔−6=3 mod 9, or 7↔−7=4 mod 2 in the last column and get a lattice with the same $\text{sys}_{1,1}(L)$ and det(L). These exchanges correspond to reflecting the lattice about a hyperplane. The inventors can also permute the three off-diagonal elements in the last column, which corresponds to a permutation of rows and columns (a column permutation is a combination of a rotation and reflection of the lattice, while a row permutation is a change of basis).

There are also examples with the same $\text{sys}_{1,1}(L)=3$ and det(L) where the Hermite normal form has diagonal entries 1, 1, 3, 3. However, these lattices have a smaller (2,2) distance.

For $\text{sys}_{1,1}=4$, the inventors found a similar result. The optimal det is 16, and among lattices with Hermite normal form having diagonal elements 1, 1, 1, 16, an optimal example is $$\begin{pmatrix} 1 & 0 & 0 & 7 \\ 0 & 1 & 0 & 5 \\ 0 & 0 & 1 & 3 \\ 0 & 0 & 0 & 16 \end{pmatrix}.$$

Again, with the given diagonal entries, this lattice is unique up to permuting the three off-diagonal entries in the last column and changing their sign. There are also lattices with the same $\text{sys}_{1,1}(L)$ and det(L) but different diagonal entries, but these have a worse (2,2) distance for the test so far.

The (2,2) distance displays an interesting phenomenon. There is a logical nontrivial logical operator of weight 8. Indeed, considering just Z-type logical operators, the inventors found 8 such logical operators of weight 8, but they are all homologically equivalent to each other. Indeed, not only are they homologically equivalent, but they are equivalent up to a translation symmetry of the lattice (even though the lattice has 16 sites, an 8-fold translation of a given representative gives the same operator back, so there are only 8 representatives at the given weight). Of course, the same holds for X-type logical operators too, because the code is self-dual up to a translation. So, at weight 8 there is some logical operator $\tilde{Z}$ that can be implemented and also some logical operator $\tilde{X}$ that can be implemented. The inventors have verified numerically that $[\tilde{Z}, \tilde{X}]=0$, i.e., these operators commute. Hence, as a stabilizer code, this code has distance 8, but as a subsystem code, this code has distance 9.

This is an interesting phenomenon where the checks all commute with each other (unlike some subsystem codes where the checks do not commute) but the inventors have a larger distance as a subsystem code. Indeed, there are 4 logical qubits that are protected to distance 9 since $\tilde{Z}$ and $\tilde{X}$ at weight 8 commute and so destroy quantum information on a total of 2 logical qubits.

At distance 9, all logical information is destroyed, i.e., one cannot find a pair of logicals which anti-commute with each other but which commute with all logical operators of weight 8 and 9. For $\text{sys}_{1,1}(L)=5$, an example with optimal determinant is $$\begin{pmatrix} 1 & 0 & 1 & 16 \\ 0 & 1 & 0 & 11 \\ 0 & 0 & 3 & 9 \\ 0 & 0 & 0 & 15 \end{pmatrix}.$$

This has (2,2) distance 15. It is noted that the inventors have not tested whether it might have a larger distance as a subsystem code and have not tested uniqueness of the lattice up to symmetries.

For $\text{sys}_{1,1}(L)=6$, an example with optimal determinant is $$\begin{pmatrix} 1 & 0 & 0 & 21 \\ 0 & 1 & 1 & 24 \\ 0 & 0 & 2 & 30 \\ 0 & 0 & 0 & 34 \end{pmatrix}.$$

For $sys_{1,1}(L)=7$, an example with optimal determinant is $$\begin{pmatrix} 1 & 0 & 0 & 115 \\ 0 & 1 & 0 & 124 \\ 0 & 0 & 1 & 136 \\ 0 & 0 & 0 & 152 \end{pmatrix}.$$

The inventors have not tested (2,2) distance or uniqueness of these lattices.

It is interesting to compare these examples to the family of codes defined by matrix $$\begin{pmatrix} d/2 & d/2 & & \\ -d/2 & d/2 & & \\ & & d/2 & d/2 \\ & & -d/2 & d/2 \end{pmatrix}$$

where d is even. This matrix is block diagonal, each block being an optimal matrix for the two-dimensional toric code at a given distance. This family has $sys_{1,1}=d$ and has $det=d^4/4$ so $det/sys_{1,1}^4=0.25$.

Also, there is a (2,2) distance $\leq d^2$ in this case, as it is the homological product of a two-dimensional toric code with itself. So, this means $$\frac{n}{(2, 2)distance^2} = 1.5.$$

Accordingly, the examples above lead to some reduction in $$\frac{n}{(2, 2)distance^2}$$

compared to this, and a more significant improvement in $sys_{1,1}$.

If the inventors consider easily sliceable examples with $n_{slice}=2$, the optimal det is shown in Table IV of FIG. 12. The inventors can also consider even higher dimensions. In Appendix A, the inventors provide an explicit family in higher dimensions which are powers of 2 and prove optimal scaling of $sys_{1,1}/det^{1/D}$ in D dimensions.

D. Starfish Order for 3D Cubic Lattice

The inventors now disclose an order for measuring Z stabilizers in 3D cubic lattices. The inventors evaluate quantum circuits in which a Z stabilizer (which is associated with a plaquette of the lattice) is measured by initializing an ancilla in the state X=+1, then applying controlled-Z (CZ) gates from qubits on each edge of the plaquette to the ancilla qubit, and finally measuring the ancilla qubit in the X basis. (One may apply a Hadamard to the ancilla and instead this becomes the more usual circuit in which the ancilla is prepared in the Z=+1 state; the inventors use CNOT gates from data qubits to the ancilla and use this notation simply so that all qubits are initialized in the X=+1 state for notational convenience.)

An order has to be picked to apply the CZ gates. The importance of choosing this order is that a single X error on the ancilla qubit can become several Z errors on the data qubits.

One or more embodiments disclose using the following order that the inventors designate "starfish". There are three directions for the 3D lattice, which the inventors call directions 1, 2, 3. An example 3D cubic lattice is illustrated in FIG. 6A, and the example order of the starfish is depicted in FIG. 6B where the directions can correspond to the x, y, and z axes. The inventors presume that each ancilla qubit (e.g., depicted in FIG. 6B) is located in the center of the corresponding plaquette (e.g., plaquette 602 depicted in FIG. 6B) and presume that each data qubit (e.g., depicted in FIG. 6B) is located in the center of the corresponding edge; this need not be the physical locations of the qubit, but the inventors use these locations to describe the order, because then each ancilla is separated from the four data qubits in the corresponding stabilizer by a vector pointing in one of the three lattice directions. As executed by the software 111 to the quantum computer 10, the inventors first apply CZ gates from data qubits to ancilla such that the ancilla qubit is displaced from that data qubit in the positive 1 direction (e.g., illustrated by operation 1 in FIG. 6B), then in the negative 1 direction (e.g., illustrated by operation 2 in FIG. 6B), then in the positive 2 direction (e.g., illustrated by operation 3 in FIG. 6B), then in the negative 2 direction (e.g., illustrated by operation 4 in FIG. 6B), then in the positive 3 direction (e.g., illustrated by operation 5 in FIG. 6B), and finally in the negative 3 direction (e.g., illustrated by operation 6 in FIG. 6B). Of course, any given ancilla qubit only participates in four of these six rounds in the quantum computer 10.

An X error on an ancilla qubit may propagate to put a Z error on the data qubits. If this ancilla X error occurs after exactly two CZ gates are done, then the propagated error has weight two acting on the east and west data qubits. The syndrome by this propagated weight-2 error is four-vertex violations. This is the reason for choosing this order, because the (starfish) order maximizes the number of violations for this kind of error. If the ancilla qubit X error occurs after one of three CZ gates, then the ancilla qubit X error causes either a weight-1 error (which is fine as it does not increase the error weight) or a weight-3 error (which is equivalent to a weight-1 error up to a stabilizer). The software 111 is configured to cause the order for measuring Z stabilizers in 3D cubic lattices to be executed on the qubits 14 of the quantum computer 10 (e.g., starfish ordering). The ordering can act as stabilizer code that is used for quantum error correction. For example, after causing execution of the CZ gates from the data qubits to the ancilla qubits on the quantum computer 10 via inputs 28 according to the starfish ordering, the software 111 receives the outputs 30 and can determine the ancilla qubit X errors discussed above. The software 111 can employ, call, and/or be integrated with suitable software to perform quantum error correction based on the determined ancilla qubit X errors, thereby providing another layer for a fault tolerant quantum computer.

The inventors have verified that this order preserves the distance (i.e., that the distance with circuit level noise is equal to the $\ell$ systole) for distance 3 and 5 codes.

III. A Method for Logical Bell Pair Creation

According to one or more embodiments, the inventors disclose a computer-implemented method 700 for creating a logical Bell pair as depicted in FIG. 7. As such, the logical Bell pair is created by first creating a 3D toric code state on the 3-torus, and then by slicing open this 3-torus into two code states which are entangled in a Bell pair (or several Bell pairs). An example protocol for creating a logical Bell pair is discussed below. The example protocol is performed by the software 111 sending the inputs 28 to the quantum computer 10 in order to cause operations and measurements on the quantum computer 10, thereby resulting in a logical Bell pair for logical qubits formed of physical qubits 14 on the quantum 10 and resulting in the outputs 30.

A. Protocol

At block 702, the software 111 is configured cause the quantum computer 10 to initialize all physical qubits 14 in the X=+1 state. Using the integral lattice boundary conditions (e.g., discussed in Section IIA), the total number of qubits is |3detM| where the rows of M are a basis for the integral lattice. Each qubit is associated with an edge.

At block 704, the software 111 is configured to cause the quantum computer 10 to measure all Z-stabilizers (each defined on a square) once. This may be performed using ancilla qubits and unitary gates.

At block 706, in response to receiving the outputs 30 of the measurements from the quantum computer 10, the software 111 is configured to apply a correction operator, e.g., some tensor product of single qubit Pauli X, to make all Z-stabilizers assume eigenvalue +1.

At block 708, the software 111 is configured to choose two disjoint subsets of qubits (e.g., logical qubits), each of which forms a closed 2-torus, such that a representative of a fixed Z-logical operator ($\tilde{Z}$) is supported on each subset, i.e., the product of the two representatives is a stabilizer of the 3D toric code. This refers to sliceability and is further explained in Section III B along with error correction in Section III C.

At block 710, the software 111 is configured to cause the quantum computer 10 to measure all qubits (e.g., physical qubits 14) in X that are not in either of the two subsets.

At block 712, in response to receiving the measurements in the outputs 30, the software 111 is configured to determine that, up to a Pauli correction, each subset of qubits (e.g., logical qubits) holds a toric code state, jointly in a Bell state. The other logical qubits, which are not in the two disjoint subsets of qubits, are not entangled by the process, thereby allowing the desired two subsets to be entangled in the Bell state.

In Section III B, the inventors analyze the correlation of the logical qubits in the absence of error. In Section III C, the inventors analyze error correction. An interesting distance becomes relevant for error correction. When the Z stabilizers are measured, the outcomes are random. However, in the absence of errors, the Z stabilizer measurement outcomes form a homologically trivial 2-cocyle (flux loops). Hence, if Z-stabilizers, these are detected unless one has at least 2d mismeasured stabilizers. The factor of 2 in 2d arises as follows: a total of d measurement errors can form a 2-cocycle which "wraps" around the torus once, because the $\ell_1$ systole is equal to d. However, such a cocycle would not be homologically trivial, so one needs 2d mismeasured stabilizers to have an undetectable error.

B. Slicing

To find the bipartition, the inventors determined that it is simplest if an easily sliceable example with $n_{slice}$=2 is provided.

If there is an easily sliceable example, with $n_{slice}$=2, and if the software 111 causes the quantum computer 10 to measure all qubits corresponding to edges in the 1 direction, measuring in the X-basis, then (in the absence of errors) the resulting logical state consists of two Bell pairs, with each of the two logical qubits of the 2D toric codes in a Bell pair with a logical qubit of the other 2D toric code.

To see this, let $\tilde{Z}_1$ be a Z-type logical operator in the first 2D toric code corresponding to a cycle in some direction of the torus, and let $\tilde{Z}_2$ be the corresponding Z-type operator in the second 2D toric code. Then, the product $\tilde{Z}_1\tilde{Z}_2$ is a homologically trivial cycle in the 3D toric code, and hence has expectation value +1. Similarly, let $\tilde{X}_1$ be an X-type logical operator in the first 2D toric code and let $\tilde{X}_2$ be the corresponding operator in the second 2D toric code. Then, the product $\tilde{X}_1\tilde{X}_2$ is a logical operator of the 3D toric code and hence also has expectation value +1.

The inventors can extend this calculation to $n_{slice}$>2. In this case, one finds that the logical qubits are in a GHZ state. Let $\tilde{Z}_i^a$, for i∈{1, . . . , $n_{slice}$} and a∈x,y be a Z type logical operator on the i-th 2D toric code corresponding to a cycle in either the x or y direction of the lattice. Let $\tilde{X}_i^a$ be a X-type logical operators, with $$[\tilde{Z}_i^a, \tilde{X}_i^a] = 0$$

so that $\tilde{X}_i^a$ is a cocycle in the other direction of the 2D lattice. Then, the logical qubits are stabilizers by $$\tilde{Z}_i^a \tilde{Z}_j^a$$

for all i, j, a and by $$\prod_i \tilde{X}_i^a$$

for all a. This calculation is a general case of the calculation in Section IV which explains the calculation for more general codes.

C. Error Correction

There can be a few more rounds of transversal gates on a prepared Bell pair (or GHZ) state on two (or more) 2D toric codes, but here the inventors prescribe measurements and classical processing to verify Bell correlation between logical qubits immediately after its preparation. Moreover, the Bell pair state (or GHZ state) of the logical qubits entangled in Section III A, Section III B, and FIG. 7 can be verified as discussed further below.

a. Logical X measurement. Because the aim is to measure X logical operators on both 2D toric codes, the software 111 is configured to cause the quantum computer 10 to measure every qubit in X on the prepared 3D toric code, where the slicing is implemented by single-qubit X measurements in the bulk and the logical X measurement is by single-qubit X measurements on 2D toric codes. The software 111 receives from the quantum computer 10 the outputs 30 resulting from measuring every qubit in X on the prepared 3D toric code, where the slicing is implemented by single-qubit X measurements in the bulk and the logical X measurement is by single-qubit X measurements on 2D toric codes. Any fault configuration is divided into two categories by the software 111. The software 111 is configured to determine that one fault is of measurement outcome flips of Z-stabilizers on squares (flux errors) and the other fault is of single-qubit Z errors on qubits that comprise the 3D toric code. The single-qubit X measurements may be faulty, but these errors can be interpreted as if there were Z errors occurring in the qubits that are measured.

A flux error (which is the measurement outcome flips of Z-stabilizers on squares) is benign for this logical X measurement because the zero flux configuration is realized by applying a certain X operator, which will be completely ignored upon single-qubit X measurements. So, the inventors only have to worry about single-qubit Z errors, and the software 111 is effectively given a perfect measurement of all X-stabilizers of the 3D toric code from the quantum computer 10.

This is a well-studied setting for error correction: a configuration of error defines a 1-chain in the cubic lattice with periodic structure (boundary conditions) defined by our integral lattice, and nontrivial logical errors occur only if the decoding results in a homologically nontrivial 1-cycle. A suitable matching decoding algorithm among other methods (known to one of ordinary skill in the art) can be used, called, and/or integrated with the software 111 to achieve fault tolerance by correcting the errors of the quantum computer 10.

b. Logical Z measurement. Now what matters is X errors on qubits and flux errors. In the bulk, all X errors are absorbed to the single-qubit measurements, so the concern is about X errors on the data qubits of the 2D toric code slices. Since all qubits of 2D toric code are measured in Z basis, the inventors infer the flux values on every plaquette reliably, and these are the syndrome bits. Any undetectable errors must come from some (dual) X string logical operator on the 2D slice. Such an error may appear by qubit X errors on the 2D slice, which requires d errors, or may be inserted by misidentified flux loop that runs parallel to one of the 2D slide, which requires 2d flux errors. Usual matching algorithm or any other 2D toric code decoding algorithm can be used to achieve fault tolerance. Again, a suitable matching algorithm or any other 2D toric code decoding algorithm (known to one of ordinary skill in the art) can be used, called, and/or integrated with the software 111 to achieve fault tolerance by correcting the errors of the quantum computer 10.

c. Reducing qubit count. The inventors have determined that the effective code distance for qubit errors Z is given by the minimal homology 1-cycle that intersects a 1-cohomology that is transverse to the 2D toric code, and the effective code distance for qubit error X is given by the minimal 1-cohomology representative of the 2D toric code, while the flux errors (flips in measurement outcomes of Z-stabilizers on squares) have effective code distance twice the $\ell_1$ systole. This allows for further optimization of the qubit count given a target effective code distance. Table V in FIG. 13 depicts optimized examples for effective code distances 5 and 7. The easily sliceable instance with d=3 is already optimal.

d. Toward Bell's inequality violation. To this end, some modification is can occur because the error correction explained above requires the aggregate of all measurement data which includes all logical information. The following modification in error correction enables fault tolerance in a hypothetical scenario where two 2D toric codes are separated far away from each other and can demonstrate Bell's inequality violation using logical qubits. In an example scenario, the inventors presume that there are three parties involved. Two parties A and B hold two logical qubits that are in a Bell state and measure correlation. The third party is a referee C that prepares a logical Bell state but does not measure Bell correlation at the logical level.

The referee C prepares all individual qubits in X=+1 state and measures square plaquettes in Z. The referee C applies X-corrections to ensure that the resulting state is the 3D toric code state with logical $\tilde{X}$=+1. Then, referee C measures out the bulk qubits in X to generate the two 2D toric code states. Let it be assumed that one toric code is A's and the other is B's. The referee C sends out these data qubits to A and B, respectively. In addition to the data qubits of A's and B's toric codes, the referee C sends the single-qubit measurement outcomes near A to A and those near B to B. For large code distances d, qubits within distance, say, d/5 from A and B are deemed near A and B, respectively. The referee C runs its own decoding algorithm to correct against Z errors that are likely supported away from A and B by distance, say, d/10. Parties A or B now perform their logical measurement fault-tolerantly using their own measurement outcomes and the outcomes that referee C has sent them. Parties A and B report their logical outcome to referee C, who combines the results and confirms Bell correlation.

In this example scenario, the referee C cannot infer the measurement outcome of either A or B beforehand, and A and B do not have access to other party's qubits. Under a local stochastic error model, it is unlikely with large d that the decoding fails because usually there will not be any long error chain that traverses the boundary regions of the window decoding.

IV. Slicing and Twisting

A more general discussion is provided of slicing and twisting, beyond the context of toric codes. This can have two uses. (1) After slicing, the software 111 by providing inputs 28 to the quantum computer 10 can produce more complicated stabilizer states of logical qubits, rather than just Bell pairs or GHZ states. (2) After slicing, the software 111 by providing inputs 28 to the quantum computer 10 can encode the logical qubits into arbitrary codes. In the case of more general codes, the rotated boundary conditions of the 3D toric code (used to improve distance) get replaced by more general automorphisms of the code.

Let D be some Calder-Shor-Steane (CSS) quantum code. In examples above with a three torus, D will be a 2D toric code. The inventors identify this code D with a chain complex with $\mathbb{Z}_2$ coefficients. This chain complex has three degrees, labelled degree 0, 1,2, and the inventors identify X-stabilizers, qubits, and Z-stabilizers with basis elements for vector spaces of degree 0, 1,2 respectively. The commutation of the Z and X-stabilizers were guaranteed by the fact that the square of the boundary operator in a chain complex is 0. Let $\partial_D$ be the boundary operator for this chain complex D. Let $D_0$, $D_1$, $D_2$ be the vector spaces of degree 0, 1, 2 in this chain complex, respectively.

Let C be some chain complex with $\mathbb{Z}_2$ coefficients with only two degrees, labelled degree 0, 1. The inventors can identify this chain complex with a classical code. In the examples above with a three torus, C is a one-dimensional toric code on a circle. The inventors refer to basis elements of degree j as j-cells, and C has $n_{slice}$ 0-cells and $n_{slice}$ 1-cells. Let $\partial_C$ be the boundary operator for C. Let $C_0$, $C_1$ be the vector spaces of degree 0, 1 in this chain complex, respectively.

Assume that D admits some automorphism group. These automorphisms of D are permutations of the 0-cells, 1-cells, and 2-cells of D (mapping j-cells to j-cells for j=0, 1, 2) which leave the boundary operator of D invariant. The inventors use symbols such as $\phi$ to denote automorphisms of D. Of course, D always admits the identity automorphism, but more general automorphisms are possible. In the case of the examples above, the automorphisms that were used are translations of the 2D toric code. Some 2D toric codes may also admit other automorphisms such as reflections or rotations, but those are not used in the above examples.

Now take a twisted product of C and D is taken. This is the same twisted product used in [4], and the twisted product is taken for the same reason, to improve code distance. First recall the untwisted product or "homological product" [5]. The chain complex C⊗D has degrees 0, 1, 2, 3. The vector space of degree k in C⊗D is $\bigoplus_{0 \leq j \leq k} C_j \otimes D_{k-j}$.

i.e., a direct sum of products of vector spaces. There is a preferred basis that the inventors use for these vector spaces; the basis elements for the vector space of degree k are given by a pair of some basis element of degree j in C and some basis element of degree k–j in D. The boundary operator of the untwisted product is $\partial_C \otimes I + I \otimes \partial_D$. If one had used coefficients other than $\mathbb{Z}_2$, the signs would have to be included in this boundary operator.

The twisted product has the same vector space of degree k and same basis as $C \otimes D$ does. However, the boundary operator is different. Let $c^0$, $c^1$ denote 0- and 1-cells in C, respectively. Let d denote an arbitrary chain in D. Then define the twisted boundary operator by $$\partial\left(c^0 \otimes d\right) = c^0 \otimes \partial d \text{ and}$$

$$\partial\left(c^1 \otimes d\right) = c^1 \otimes \partial d + \sum_{a^0 \in \partial c^1} a^0 \otimes \phi\left(c^1, a^0\right)d.$$

It is noted that the boundary operator acting on $c^0 \otimes d$ is the same as in the twisted case, but the boundary operator acting on $c^1 \otimes d$ is different. Here, $\phi(c^1, a^0)$ is an arbitrary choice of automorphism of D for each pair $c^1$, $a^0$, where $a^0$ is a 0-cell of C.

In the (twisted) product, the inventors identify 0-, 1-, 2-cells with X-stabilizers, qubits, and Z-stabilizers, respectively. 3-cells correspond to redundancies of the Z-stabilizers, enabling a single shot property.

One may verify that the examples above do indeed correspond to this twisted product. The elements below the diagonal of the first column in the Hermite normal form correspond to the automorphism $\phi$ of the 2D toric code used.

Now, consider the case of general C, D. The inventors again prepare all physical qubits in the X=+1 state. The inventors then measure Z-stabilizers of the twisted product and then measure out all qubits corresponding to 1-cells of the form $c^1 \otimes d^0$; this is the generalization of measuring qubits corresponding to edges in a given direction.

The remaining qubits are on 1-cells of the form $c^0 \otimes d^1$. Thus, there is one quantum code D for each 0-cell of C. One may verify that the stabilizers of D are obeyed, possibly with a sign depending on measurement outcome.

Now, to analyze the state of the logical qubits of these codes D, first the inventors consider the untwisted case. Logical X-type operators correspond to elements of first cohomology, and the Künneth formula gives representatives for these elements. These representatives are of the form $\tilde{c}^j \otimes \tilde{d}^{1-j}$, where $\tilde{c}^j$ is a representative of j-th cohomology for C, and $\tilde{d}^{1-j}$ is a representative of (1–j)-th cohomology for D. The operators corresponding to elements j=1 are measured out, so the remaining operators correspond to elements of the form $\tilde{c}^0 \otimes \tilde{d}^1$. Each representative $\tilde{d}^1$ corresponds to some given X-type logical operator of D. The X-type logical operators of D are denoted by $\tilde{X}^a$, where a is some discrete index. There are several copies of D; the X-type logical operator $\tilde{X}^a$ is denoted on a given copy v by $\tilde{X}_v^a$. Then, the inventors have logical stabilizers of the form $$\prod_{v \in \tilde{c}^0} \tilde{X}_v^a,$$

for each representative $c^0$. For example, in the case of a GHZ state from slicing a 3D toric code, these are the operators $$\prod_i \tilde{X}_i^a.$$

Since the entangled logical state is pure, it can be deduced that the inventors also have Z-type stabilizers corresponding to the commutant of these X-type logical operators. One may also calculate this directly. For example, let $\tilde{d}_1$ be a representative of first homology for D. For any 1-cell $c_1$, the inventors have $\partial(c_1 \otimes d^1) = (\partial c_1) \otimes \tilde{d}_1$, and these correspond to logical Z-type stabilizers. If $d_1$ corresponds to some logical operator $\tilde{Z}^a$, then the inventors have Z-type stabilizers $$\prod_{v \in \partial c_1} \tilde{Z}_v^a.$$

Indeed, this is the commutant of the X-type logical operators.

Thus, it can be seen that the inventors can prepare any pure CSS stabilizer state of the logical qubits by choosing an appropriate C so that the boundary operator of C encodes the Z-type stabilizers of the state.

Thus far, the untwisted case has been considered. In the twisted case, if the twist acts trivially on homology and cohomology, so that it maps a representative of a given class to a representative of the same class, then the entanglement of the logical operators is the same as in the untwisted case. The Künneth formula representatives $\tilde{c}^0 \otimes \tilde{d}^1$ need not be elements of cohomology; indeed, they need not be coclosed in this case. However, the inventors can make them coclosed by adding appropriate cells of the form $c_1 \otimes d_0$ to cancel terms arising from the twist. Similarly, for the logical Z-type stabilizers, the inventors no longer have $\partial(c_1 \otimes \tilde{d}_1) = (\partial c_1) \otimes \tilde{d}_1$, but rather some automorphism is applied to $\tilde{d}_1$. However, if the automorphism acts trivially on homology, then inventors have the same stabilizers for the logical operators.

If the twist does not act trivially on homology and cohomology, this case is not considered.

V. Transversal Logical Clifford Gates

First, the inventors can realize $2n_{slice}$ logical qubits by taking $n_{slice}$ slices of a 3D toric code on the three-torus. In this section, described is how to apply a general Clifford circuit to these $2n_{slice}$ logical qubits.

It is noted that in certain instances, the inventors may choose to compile $n_{slice}$ logical qubits into $n_{slice}$ slices of the 3 torus.

A. Logical Hadamard

A logical Hadamard exists in toric code whenever there is a permutation P of the qubits which interchanges the X and Z stabilizers. In such a case the logical Hadamard is given by $$U = \bigotimes_i H_i \bigotimes_{i: P(i) \neq i} SWAP_{iP(i)} \tag{Eq. 8}$$

In the above formula of Eq. 8, i: $P(i) \neq i$ runs over a complete set of distinct pairs (i,P(i)).

An example is if one slices into the toric code described by $$\begin{pmatrix} n & 0 \\ 0 & n \end{pmatrix}. \tag{Eq. 9}$$

The permutation is given by translating all the qubits by the vector $(\pm\frac{1}{2}, \pm\frac{1}{2})$.

B. Logical Phase Gate

The logical phase gate can be realized in certain instances. To do so, the inventors found a permutation of P of the qubits which interchanges X and Z stabilizers, and leaves at least one qubit invariant. The corresponding unitary is given by $$U = \bigotimes_{i:P(i)=i} S_i \bigotimes_{i:P(i)\neq i} CZ_{iP(i)}. \qquad \text{(Eq. 10)}$$

Here, again i: $P(i)\neq i$ runs over a complete set of distinct pairs $(i,P(i))$. The operator U is a symmetry of the code.

An example is if one slices into the toric code described by $$\begin{pmatrix} n & 0 \\ 0 & n \end{pmatrix}. \qquad \text{(Eq. 11)}$$

A permutation which does the job is a reflection across the line $a(\frac{1}{2},1/2)+(\frac{1}{2},0)$, with areal.

C. Logical Control Not

Since the codes are CSS and directly copied, a logical CNOT is realized transversally.

D. Examples

Together, CNOT, S, and H generate the full Clifford group. Examples of 3D toric codes that slice into 2D toric with a Clifford complete gate sets are, in Hermite normal form, $$\begin{pmatrix} 2 & 1 & 1 \\ 0 & 3 & 0 \\ 0 & 0 & 3 \end{pmatrix}, \begin{pmatrix} 2 & 1 & 1 \\ 0 & 5 & 0 \\ 0 & 0 & 5 \end{pmatrix}, \begin{pmatrix} 2 & 5 & 3 \\ 0 & 7 & 0 \\ 0 & 0 & 7 \end{pmatrix} \qquad \text{(Eq. 12)}$$

describing codes with parameters [[54,3,3]], [[150,3,5]], and [[294,3,7]].

VI. Transversal Logical Non-Clifford Gates

In this section, one technique for doing a non-Clifford gate is provided. The starting point is the 3D color code on a 3-manifold M. The 3D color code consists of a volume 4-colorable cellutation of the manifold M, along with a single qubit on every 0-cell. Each X-type stabilizer generator is identified with a 3-cell and consists of a product of Pauli-X on the 0-cells at the boundary of that 3-cell. Similarly, each Z-type stabilizer generator is identified with a 2-cell and consists of a product of Pauli-Z on the 0-cells at the boundary of the 2-cell. The volume 4-colorability condition guarantees the stabilizers commute. If all homology 1-cycles have even length, then the 1-skeleton of the cellulation is a bipartite graph. The resulting topological code is equivalent to 3 copies of the 3D toric code.

The inventors prepare the state by placing all qubits in the |+⟩ state and then measure the Z-plaquettes. The Z-plaquette measurements can be achieved in a similar fashion to how the plaquettes of the 3D toric code are measured above. The logical membrane operators are initialized in the logical |+⟩ state.

The 3D color code admits a bipartite transversal non-Clifford gate given by $$T^{(b)} = \left(\bigotimes_{v\in A} T_v\right)\left(\bigotimes_{v\in B} T_v^{\dagger}\right),$$

where A/B are the A and B sublattices of the bipartition, and v runs over all vertices. The gate $T^{(b)}$ will realize a non-Clifford logical gate depending on what the manifold is and depending on the boundary conditions. $T^{(b)}$ realizes logical CCZ on a 3-torus, logical CCZ on $\mathbb{R}\,\mathbb{P}^3$, logical T on the tetrahedron (color boundaries), etc.

Now turning to the protocol, the inventors prepare a non-Clifford state on the 3-manifold by first measuring into the color code. The inventors either post-select on the +1 stabilizer state, or provide one round of corrections depending on the measurement outcomes. Next, the transversal $T^{(b)}$ gate is applied to realize a non-Clifford state. The inventors then pick a subset of qubits (e.g., a 2-torus if M is a 3-torus) and measure all qubits outside of that subset in the X basis. The remaining state is a color code with an encoded non-Clifford state. A subset of those qubits can now be measured, and potentially a layer of entangling gates applied, to produce a non-Clifford state encoded in the 2D toric code, which is compatible with the Clifford quantum computer described above.

As an example, consider the bitruncated cubic honeycomb lattice (the Voronoi tesselation of body-centered cubic lattice) on a 3-torus. A coordinate plane is chosen to slice through this lattice which is exactly a 4.8.8 lattice on the 2-torus. Next, all qubits outside of this plane are measured in the X basis. The resulting state is a non-Clifford state encoded on the 2D color code on a torus with a constant probability. Further, the process is to apply a CNOT on each edge connecting a 4-gon and measure the target qubits in the Z-basis. Up to an atom rearrangement, the resulting state is a surface code on the torus with a non-Clifford state.

Alternatively, the inventors may use existing solutions to use a 3D color code with open boundary conditions. The preparation of the encoded |+⟩ can be done by measuring Z-stabilizers once. The transversal $T^{(b)}$ induces a logical T gate, and it is well understood how this logical state in 3D system of qubits can be transferred to a 2D color code patch by single-qubit measurement. Then, this can be teleported into a 2D toric code which is the logical building blocks.

VII. Hardware Implementation

A. Neutral Atom Architecture

Optically trapped neutral atoms offer a flexible gate based quantum machine with many potential upsides. Qubits are typically encoded into the long lived hyperfine states of the neutral atom. Selectively exciting one of the hyperfine states into a Rydberg state enables a strong short-ranged interaction that can be used for realizing gates. Operated as a gate based quantum computer, fidelities have been reported as high as 99.5% for two qubit entangling CZ gates with higher fidelity single qubit gates [7]; fidelities of 99.8% for Bell state preparation have also been reported [8]. Arbitrary single qubit gates can also be implemented with high fidelity. High fidelity geometry flexible gates combined with long vacuum lifetimes make neutral atom systems a promising candidate for building a quantum computer.

Components of the proposed neutral atom architecture for a quantum computer can include the following items. A vacuum chamber holding a gas of neutral atoms (such as Rubidium, Yterbium, or Strontium). A magneto-optical trap (MOT) used to trap and laser-cool a subset of the neutral atoms. An optical trap, such as array of optical tweezers or an optical lattice. A method for atom rearrangement to move atoms to operational zones, where an example would be a set of optical tweezers. The optical tweezers are controlled by optical modulators and typically include two types: an acousto-optic deflector (AOD) and a spatial light modulator (SLM). Both the AOD and SLM enable atom rearrangement. The SLM is "slow" and moves atoms on a time scale of milliseconds, while the AOD is fast and moves atoms on the time scale of microseconds. Finally, the neutral atom architecture includes a camera used for measurement of the atomic states.

Features of the quantum computer may include several operational zones, not all may be included for a given quantum machine, as discussed below. That is, different architectures allow different forms of computation. The neural atom architecture can include a cooling zone such as the MOT where atoms can be cooled and prepared to be used; a storage zone where atoms can be held during a computation; and an operation that continuously transfers atoms from the cooling zone to one or more operational zones. The neural atom architecture can include one or more gate zones that enable of operational gates such as single qubit rotations, and entangle Clifford gates such as CZ and CNOT gate, or a non-Clifford gate. These gates can be implemented by moving atoms to gate specific zones, or leaving atoms stationary and pulsing them with a laser field. The neural atom architecture can include a measurement zone having of one or more types of measurements, such as a destructive readout of qubit states or a non-destructive readout of qubit states. Depending on which zones are presents, the neutral atom system can be operated in various ways.

1. Neural Atoms with Destructive Measurement

In the setting where there are destructive measurements. The codes described in Section II and the Bell pair correlation experiment described in Section III can be implemented in a straightforward manner. One picks a code and creates the state using the circuits described within those sections. In combination with Section V, one can achieve a quantum computer with a Clifford complete gate set.

2. Neutral Atoms with Atom Reservoir and Destructive Measurement

In the case where there is a supply of neutral atoms (i.e., a reservoir), the inventors can operate the codes differently. A steady supply of neutral atoms allows one to measure stabilizers as many times as desired, thereby increasing the fidelity of the measurement outcome. The rate at which stabilizers can be measured determines whether such a situation is performative. In this regime, the inventors operate the codes not as single shot codes, but usual stabilizer codes.

3. Neutral Atoms with Non-Destructive Measurement

Similar to when there is a reservoir, one can operate the stabilizer codes in the typical way, by continually measuring the stabilizers. In principle, the inventors only need one ancilla. In practice, more ancilla would be better because they give parallel readout of stabilizers.

B. Trapped Ion Architecture

When qubits can be re-used, such as in a trapped ion architecture, the inventors can operate the codes as a memory. Logical gates can be implemented in the same way as described above.

Appendix A: Higher Dimensions

The inventors now consider arbitrary dimension D. First, this process gives an explicit family for D a power of 2, and then gives a randomized construction that is optimal up to constant factors.

1. Explicit Family

One can also consider a family in even higher dimensions. Let $$H \equiv \begin{pmatrix} 1 & 1 \\ -1 & 1 \end{pmatrix}, \tag{A1}$$

$$H^2 = 2I_2. \tag{A2}$$

$$\det H = 2. \tag{A3}$$

Consider $D=2^t$ dimensions, and take $H^{\otimes t}$ This matrix is a so-called Hadamard matrix, sometimes denoted $H_D$. The determinant is $2^{t2^{t-1}}$ because $\det[(H^{\otimes t})^2]=\det(2^t I_{2^t})=2^{t2^t}$.

In D=4 (t=2), the minimum nonzero $\ell_1$-norm of $\Lambda$ is 4. Hence, the rotated (1,3)-toric code has parameters $[4\cdot16\,\ell^4, 4, 4\,\ell]$ with smallest [[64,4,4]].

Note one has $$H_D = \begin{pmatrix} H_{D/2} & H_{D/2} \\ -H_{D/2} & H_{D/2} \end{pmatrix}. \tag{A4}$$

From this, the inventors can prove inductively that the $\ell_1$ systole is equal to D. Note first that each row has $\ell_1$ norm D so that the $\ell_1$ systole is at most D. Now, assume that $H_D/2$ has $\ell_1$ systole equal to D/2. Consider a nonzero vector v in the lattice defined by $H_D$. In the first D/2 columns, v is some vector in $H_{D/2}$, and so if it is not vanishing in those columns then those columns contribute at least D/2 to the $\ell_1$ norm. The same holds for the last D/2 columns. So, if v is nonvanishing, then either v has $\ell_1$ norm at least D/2+D/2=D or v vanishes in either the first D/2 columns (in which case v is equal to twice a vector in $H_D/2$ in the last D/2 columns) or v vanishes in the last D/2 columns (in which case, conversely, v is equal to twice a vector in $H_D/2$ in the first D/2 columns). So, the result follows inductively as described.

2. The "$\ell_1$ Hermite Constant"

Now, consider a D-dimensional lattice L, for arbitrary D. How large can the ratio be for the following.

$$\frac{sys_{1,1}(L)}{\det(L)^{1/D}}$$

If the inventors define $sys_{1,2}(L)$ to be the shortest length with the $\ell_2$ norm of a nonzero vector in a D-dimensional lattice L, then it is well known that (see references in [9] for example)

$$\sup_{L, \det(L)\neq 0} \frac{sys_{1,2}(L)}{\det(L)^{1/D}} = \Theta(\sqrt{D}),$$

where the inventors take the supremum over all D-dimensional lattices L. The square of this ratio is called Hermite's constant.

Theorem A.1. For a D-dimensional lattice L, the inventors have $$\sup_{L,\, det(L) \neq 0} \frac{sys_{1,1}(L)}{\det(L)^{1/D}} = \Theta(D).$$

Proof. The upper bound $$\sup_{L,\, det(L) \neq 0} \frac{sys_{1,1}(L)}{\det(L)^{1/D}} = O(D)$$

follows immediately from the $\ell_2$ bound $$\sup_{L,\, det(L) \neq 0} \frac{sys_{1,2}(L)}{\det(L)^{1/D}} = O(\sqrt{D})$$

combined with the fact that the $\ell_1$ norm of a vector is at most $\sqrt{D}$ larger than the $\ell_2$ norm of that vector.

So, the inventors now establish the lower bound $$\sup_{L,\, det(L) \neq 0} \frac{sys_{1,1}(L)}{\det(L)^{1/D}} = \Omega(D).$$

The proof leaves some constants arbitrary; the used can optimize the choices of these constants to obtain the best bound using the methods here. However, it is possible that even better lattices could be found by other techniques.

For example, take some given D, pick some constant C>1, let p be the least prime larger than $C^D$. Consider a lattice $L_A$ given in Hermite normal by $$A = \begin{pmatrix} 1 & & & & a_1 \\ & 1 & & & a_2 \\ & & 1 & & a_3 \\ & & & \dots & \dots \\ & & & & p \end{pmatrix}.$$

Choose the entries $a_1, a_2, \dots, a_{dn1}$ randomly from $0, \dots, p{-}1$, uniformly and independently. Note that $\det(L){=}C(1{+}o(1))$. The inventors use a first moment method to show that, with high probability, $sys_{1,1}(L_A){=}\Omega(D)$, by bounding the average (over choices of $a_i$) number of nonzero vectors v in the lattice with $\ell_1$ norm smaller than rn, for some given r.

The inventors show that, for sufficiently small r this number is o(1), and so with high probability, $L_A$ has $sys_{1,1}$ $(L_A){\geq}rn$, proving the Theorem A.1.

Such a vector v is given by v=uA, for some nonzero integer vector u. It is immediate the at least one of the first D−1 entries of u must be nonzero. Further, $$|v|_1 \geq \sum_{i=1}^{D-1} |u_i|.$$

There is $$v_n = \sum_{i=1}^{D-1} u_i a_i,$$

and so for a given choice of $u_1, \dots, u_{D-1}$ with at least one $u_i$ nonzero, and a random choice of $a_1, \dots, a_{D-1}$, the inventors have $v_n$ equal (mod p) to a uniformly random number in the range $0, \dots, p{-}1$. The probability that this number is within rn of 0 (mod p) is rn/(p−1).

Accordingly, the average number of nonzero vectors in the lattice with $\ell_1$ norm smaller than rn is bounded by $$N_{rn} \frac{rn}{p-1},$$

where $N_{rn}$ is the number of choices of $u_1, \dots, u_{D-1}$ such that $$\sum_{i=1}^{D-1} |u_i| \leq rn.$$

Bounding $N_{rn}$ is a standard computation and one has $N_{rn}{=}O(\exp(C'(r)D))$, where C'(r) is a constant depending on r. As r→0, also C'(r)→0. So, for any given C>1, one may choose r sufficiently small that C'<C and so $$N_{rn} \frac{rn}{p-1} = o(1).$$

Appendix B: 24-Cell Honeycomb and its Subdivisions

The four-dimensional hypercubic lattice leads to stabilizers of weight 6, with each qubit participating in 4 stabilizers. It is interesting to ask whether these numbers can be reduced by a different cellulation of the torus.

Here, the inventors give an example that makes progress: it reduces the weight of one type of stabilizer without increasing the weight of the other type on average.

The starting point is a cellulation of $\mathbb{R}^4$ called the 24-cell honeycomb. A review is provided some of the geometry of this below to guide the reader. There is an incidence matrix of this [10].

The cellulation has four-dimensional cells which are convex polytopes called 24-cells. The terminology may be confusing, and many authors use d-cell to refer to a d-dimensional cell but here a 24-cell is a four-dimensional cell.

The three-dimensional cells are octahedra. The two dimensional cells are triangles. Thus, taking X stabilizers on octahedra and Z-stabilizers on edges, each X-stabilizer has weight 8. At the same time, each Z stabilizer has weight only 4. Each qubit on a triangle participates in 3 X-stabilizers and 3 Z-stabilizers.

Thus far, while this cellulation reduces the Z-stabilizer weight compared to the hypercubic lattice, it increases the X-stabilizer weight. However, the inventors now subdivide each octahedron into two solid pyramids, with each pyramid having a four-sided basis. Thus, each pyramid corresponds to an X stabilizer of weight 5, so the weight is reduced below 6. Now, there are qubits on triangles and squares, so some qubits are in 3 Z stabilizers and some are in 4.

The X-stabilizer weight increases, however. Each octahedron has 12 edges and the inventors have attached an additional square to 4 of those edges, increasing the weight of the corresponding X stabilizer by 1. Thus, when a given octahedron is subdivided, the inventors increase the weight of ⅓ of the edges in that octahedron by 1. Each edge is in 6 octahedra, so on average, the weight of an X-stabilizer is increased by 6/3=2, and hence the average weight of X stabilizers is equal to 6 if one subdivides an even octahedron; the precise pattern of weights depends on how one subdivides them.

The inventors return, however, to consider the 24-cell honeycomb, without subdivision. The 24-cell honeycomb gives a cellulation of $\mathbb{R}^4$. Instead, the inventors pursue some finite number of 24-cells that will cellulate $\mathbb{T}^4$. The following is provided.

Indeed, the consideration is a single 2-cell. The 24-cell has 24 vertices, which conveniently may be chosen to be any of the $$\binom{4}{2} = 6$$

permutation of $(\pm 1, \pm 1, 0, 0)$. The edges have length $\sqrt{2}$, where each edge goes from a vertex with two nonzero coordinates to some other vertex with two nonzero coordinates, where the two vertices share a single nonzero coordinate. There are two types of triangles. In one type, there is one coordinate that is nonzero in all three vertices, while the other coordinates are nonzero in exactly one vertex. There are $4*2^4=64$ such triangles, as the inventors pick one of the 4 coordinates, and pick 4 signs. In the other type, there is one coordinate that is zero in all three vertices. There are $4*2^3=32$ such triangles, as the inventors pick a coordinate to be zero, and pick 3 signs. This gives a total of 96 triangles.

There are two types of octahedra. In one type, the inventors select one of the four coordinates, and in every vertex that coordinate is +1 or −1 (the same value in all vertices). In the other 3 coordinates, there is one vertex where that coordinate is +1 and one where is −1, and it is zero in all the others. There are 8 such octahedra as the inventors pick a coordinate and a sign.

Also, there are octahedra with vertices $(s_1, s_2, 0, 0)$, $(s_1, 0, s_3, 0)$, $(s_1, 0, 0, s_4)$, $(0, s_2, s_3, 0)$, $(0, s_2, 0, s_4)$, $(0, 0, s_3, s_4)$, where each $s_1, s_2, s_3, s_4$ is a sign $\pm 1$. There are $2^4=16$ such octahedra. This gives a total of 24 octahedra, hence the name 24-cell.

The 24-cell honeycomb is the Voronoi cellulation of the $D_4$ lattice. Now consider how this arises. The centers of the octahedra are readily calculated. For the first type of octahedron, the center is at some permutation of $(+1,0,0,0)$, while for the second type the center is at $(s_1/2, s_2/2, s_3/2, S_4/2)$. The centers of these octahedra are at the midpoint between two vertices of the $D_4$ lattice. Thus, doubling these centers, one can find a vector going from one vertex of the $D_4$ lattice to neighboring one, i.e., the given by permutation of $(\pm 2,0,0,0)$ and $(s_1, s_2, s_3, S_4)$.

From these vectors going from a vertex of the $D_4$ lattice to a neighboring one, the inventors can find a basis for the $D_4$ lattice, being $(2,0,0,0)$, $(0,2,0,0)$, $(0,0,2,0)$, $(1,1,1,1)$. In fact, this choice of lattice basis vectors is conventionally used for the $F_4$ lattice, which is the same as the $D_4$ lattice up to rotation of $\mathbb{R}^4$. The reader may verify that by rotating and rescaling these can be turned into the basis $(1,1,0,0)$, $(1,0,1,0)$, $(1,0,0,1)$, $(2,0,0,0)$ of the $D_4$ lattice.

One can now see how to take a cellulation of $\mathbb{T}^4$. One can take the cellulation of $\mathbb{R}^4$ and mod out by some sublattice of the $D_4$ lattice. The smallest code is given by modding out by the lattice itself. In this case, several of the 96 triangles become identified with each other and there are only 32 triangles total. Indeed, there are 24 edges, 32 triangles, and 12 octahedra per lattice vertex in general.

Thus, the inventors can define a code on 32 qubits from the minimal cellulation. A numerical search verifies that the minimum weight X-type logical operator has weight 6. Unfortunately, the minimum weight Z-type logical operator has weight only 2. Likely, if one subdivides the octrahedra, the Z distance will increase. However, it is unlikely to be a useful code in this minimal example. Larger cellulations may lead to useful codes with reduced stabilizer weight compared to (2,2) toric codes on hypercubic lattices.

Appendix C: Numerics On 4D Codes

1. Searching for Optical Codes

Using the Hermite normal form, it is possible to exhaustively enumerate lattices and find the minimum determinant det(L) for a given distance $sys_{1,1}(L)$. To do this quickly on a computer (e.g., with software 111), one can iterate over all possible diagonal elements whose product is less than or equal to some guessed upper bound on the determinant. If the product of these diagonal elements is less than or equal to the best determinant found so far on the search, one then iterates over off-diagonal elements. One can quickly discard many of these lattices, as the sum of entries on each row must be at least the target $sys_{1,1}$. Finally, if the given Hermite normal form passes these tests, one can run a further search to verify the distance $sys_{1,1}$.

Several techniques can be used to speed up the enumeration used to determine distance. The inventors label the qubits $0, 1, 2, \ldots, q_{max}$ for some $q_{max}$. For these (2,2) codes, $q_{max}=6\det(L)-1$. The plaquettes can be labelled by vertices of the lattice and by a choice of two lattice directions.

Then, the inventors use a recursive routine with roughly the following pseudocode. This is a recursive routine check $(S, w_{max}, q_{start})$ defined by:

for $q=q_{start}$ to $q_{max}$ do:

A. Let $S_{new}$ equal S exclusive-OR with the pattern of stabilizers violated by a single Z error on qubit q.

B. if $S_{new}=0$, then an error pattern that produces no violated stabilizers has been found. See below.

C. if $|S_{new}|\leq 4*(W_{max}-1)$, call check $(S_{new}, W_{max}-1, q+1)$.

This is a recursive routine to enumerate all patterns of Z errors on qubits with weight (the weight of some pattern of errors can be the number of errors in the pattern) at least 1 and at most $W_{max}$ for some $W_{max}$, with all qubits taken in the range $q_{start}>\ldots, q_{max}$ which produces some given syndrome S. By calling this routine with the empty syndrome S=0 (i.e., no violated stabilizers) with $q_{start}=0$ one can find all error patterns that violate no stabilizers with weight at most some $W_{max}$. Then, one may test which of these produce a logical error by computing their $\mathbb{F}_2$ inner product with some known representatives of X-type logical operator.

A basis of these logical operator representatives is particularly easy to write down if det(L) is odd. For each of the $$\binom{4}{2} = 6$$

different choices of two lattice directions, one takes the sum over all plaquettes with that given choice.

This performs the desired enumeration. Step C of the recursive routine contains two techniques. First, note that check is called with $q_{start}=q+1$, so that when calling check with some given $W_{max}$ the recursive routine only enumerates over $\binom{q_{max}}{w_{max}}$ different errors patterns. Second, the recursive routine only calls recursively check if $|S_{new}|\leq 4*(w_{max}-1)$, where $|S_{new}|$ is the Hamming weight; this is done because a single qubit error only changes the value of 4 stabilizers, so if this inequality does not hold, it is not possible for the recursive call to ever give a pattern with no violated stabilizers. Use of this inequality leads to a large speedup.

In step B of the recursive routine, the pseudocode indicates that the inventors have found an error pattern. This error pattern is given by concatenating q with whatever error pattern was chosen in the previous calls of check. One may keep track of this error pattern found on previous (execution/run) then by adding some additional variables, or one may simply keep track of the inner product of the error pattern with various X-logical operator representatives and update that inner product on the recursive call, to determine if there is a nontrivial logical error.

This can be sped up further using bitwise manipulations. If there are 64 or fewer stabilizers, one can store which stabilizers are violated as a 64 bit integer, with each bit corresponding to a given stabilizer. With more than 64 such stabilizers, one can store which stabilizers are violated as an array of such integers. One stores an array of 64 bit integers (or an array of arrays if there are more than 64 stabilizers), of size $q_{max}$. Each entry of the array contains the bit string (or array of bit strings) showing the stabilizer pattern caused by a single qubit error. Then, step A of the recursive routine can be done using bitwise-XOR, and the weight in step C of the recursive routine can be computed using builtins such as popcount. Similarly, one can keep track of the inner product of an error pattern with X-logical operator representatives using bitwise manipulations.

A further speedup using translation symmetry is useful for larger sizes. Note that given any logical operator, any translate is also a logical operator. So, the inventors may assume that some error occurs on one of the 6 plaquettes corresponding to some fixed vertex. It is convenient to take some ordering of the qubits so that these plaquettes correspond to qubit labels 0, det(L), 2det(L), 3det(L), 4det(L), 5det(L). So, the inventors may use the following algorithm to find logical operators of weight at most $W_{max}$. This is a loop which then calls the recursive routine check.

for q in 0, det(L), 2det(L), 3det(L), 4det(L), 5det(L) do:
        A. Let $S_{new}$ be the pattern of stabilizers violated by a single Z error on qubit q.
        B. Call check ($S_{new}$,$W_{max}$−1,q+1).

This enumerates logical operators up to translation symmetry. To count actual number of logical operators, one can consider translates of the operators found by this routine. The number of translates of a given operator is at most det(L) but may be smaller.

Using these techniques, the inventors were able to obtain the results in Table III of FIG. 11 in a reasonable time on a single core (of e.g., computer 100). One may be able to further speedup the enumeration for even larger examples using the fact that one can assume that any minimum weight logical operator has connected support, but this makes the enumeration more complicated.

2. Memory

Compared to general low-density parity check (LDPC) codes, toric codes present several possible advantages. First, (p, p) toric codes on hypercubic lattices are self-dual up to a permutation of the qubits, so they can implement a logical Hadamard (and permutation of the logical qubits) by applying a Hadamard to every physical qubit and permuting the physical qubits. Second, lattice surgery can enable joint measurement of logical operators on two different toric code patches. Depending how one glues two tori together, one can measure an arbitrary Z logical operator in one patch multiplied by an arbitrary Z logical operator in the other patch (or X logical, in both). Finally, (p, q) toric codes for p, q≥2 are self-correcting memories, and have single-shot properties. Finally, some toric codes allow transversal non-Clifford operations. This includes (2,1) toric codes but does not include (2,2) toric codes. In general, one should have either 2p>d or 2q>d to allow non-Clifford operations by a version of the argument of. Suppose 2p>d; then, the group commutator K of equation 1 of will be supported on a (2p−d)−dimensional surface. However, indeed one should expect that 2p−d≥q are needed in order for the group commutator to be a nontrivial logical operator. Thus, the lowest dimension for a self-correcting toric code supporting non-Clifford transversal gates is a (4,2) code in six dimensions.

Of course, general LDPC codes may have some of these properties too. Some codes allow a transversal Hadamard up to permutation of the physical and logical qubits, such as, for example a hypergraph product code where the two codes in the product are dual to each other. Some general LDPC codes allow pairwise measurements of logical operators, and weight reduction techniques can be used to implement high weight logical operators in more general codes. Finally, there are good LDPC codes with the single shot property.

Still, it is worth considering these (2,2) codes as quantum memories. The inventors have tested the performance using the standard circuit noise model: with probability p, any one or two qubit gate may fail, and similarly any initialization or measurement may fail. A failure in initialization or measurement means initializing to the orthogonal state or returning the wrong measurement outcome, while a failure in a one or two qubit gate means choosing one of 3 or 15 possible nontrivial Pauli errors. The inventors assume the ability to initialization and measure in Z or X bases, so one qubit gates such as the Hadamard are not needed. The inventors used a four-dimensional starfish ordering to measure stabilizers (i.e., measuring each of four direction in turn, and measuring positive and negative in each direction), alternately measuring X-type and Z-type stabilizers. Idle errors were ignored.

As a simple test of the single-shot performance, the inventors used a simple decoder that had no memory: it would decode a given round of Z (or X) stabilizer measurements without using any previous rounds of stabilizer measurements (including previous rounds of either type). The decoder is explained below. The inventors tested the example with det=16 and hence 96 data qubits and 64 stabilizers of each type. So, each decoding took at input 64 bits of data (the measurement of 64 stabilizers of a given type), and outputted some correction (i.e., some Pauli X operators to apply if Z stabilizers had been measured, and vice versa). The inventors used the code as a subsystem code with 4 logical qubits. The inventors found that at $p=10^{-3}$, the rate of Z-type logical errors was less than $3 \times 10^{-6}$. The rate of X-type logical errors is of course the same, though errors tend to correlate so that if a Z logical error occurs, then an X logical error may be more likely to occur. It is noted that this is using a single-shot decoder against circuit level noise. A more complex decoder incorporating memory may have better performance, and a natural choice is a BP-OSD decoder using memory between rounds. In particular, since a given round of, for example, X-type measurements typically have one decoding of minimum weight, the decoding of an X-type round provides information about which gates have errors allowing one to locate correlated errors for the subsequent Z-type round.

The decoder used was a simple minimum weight decoder. At this small size, using bitwise operations, it is possible to quickly enumerate possible faults of low weight. Elementary faults included were single qubit faults, single errors in stabilizer measurement, correlated errors of weight 2,3,4 caused by an error in the previous round (e.g., the previous measurement of X-type stabilizers if one is now decoding Z-type stabilizers), and errors causing 2 or 3 stabilizers of the given type (e.g., Z-type stabilizers if one is now decoding stabilizers) to be flipped if an error occurred partway through stabilizer measurement (in this case, the inventors treated this elementary fault as causing an error in stabilizers, but not causing a flipped qubit). The inventors took the minimum weight error, choosing the first one in lexicographic order if there were several. If no error pattern of weight≤6 was found to produce the observed syndrome, the inventors picked an error pattern of weight≤6 which gave a syndrome as close as possible to the observed syndrome, but the inventors followed a heuristic: the inventors required that increasing weight of the error pattern is to reduce the distance to the observe syndrome by at least two for the higher weight pattern to be used.

Although some very specific examples have been provided during experiments, simulations, etc., herein, one or more embodiments are not limited to every detail. The concepts and illustrations of the present disclosure should not be so limited and can be generalized as understood by one or ordinary skill in the art.

Figure 8:
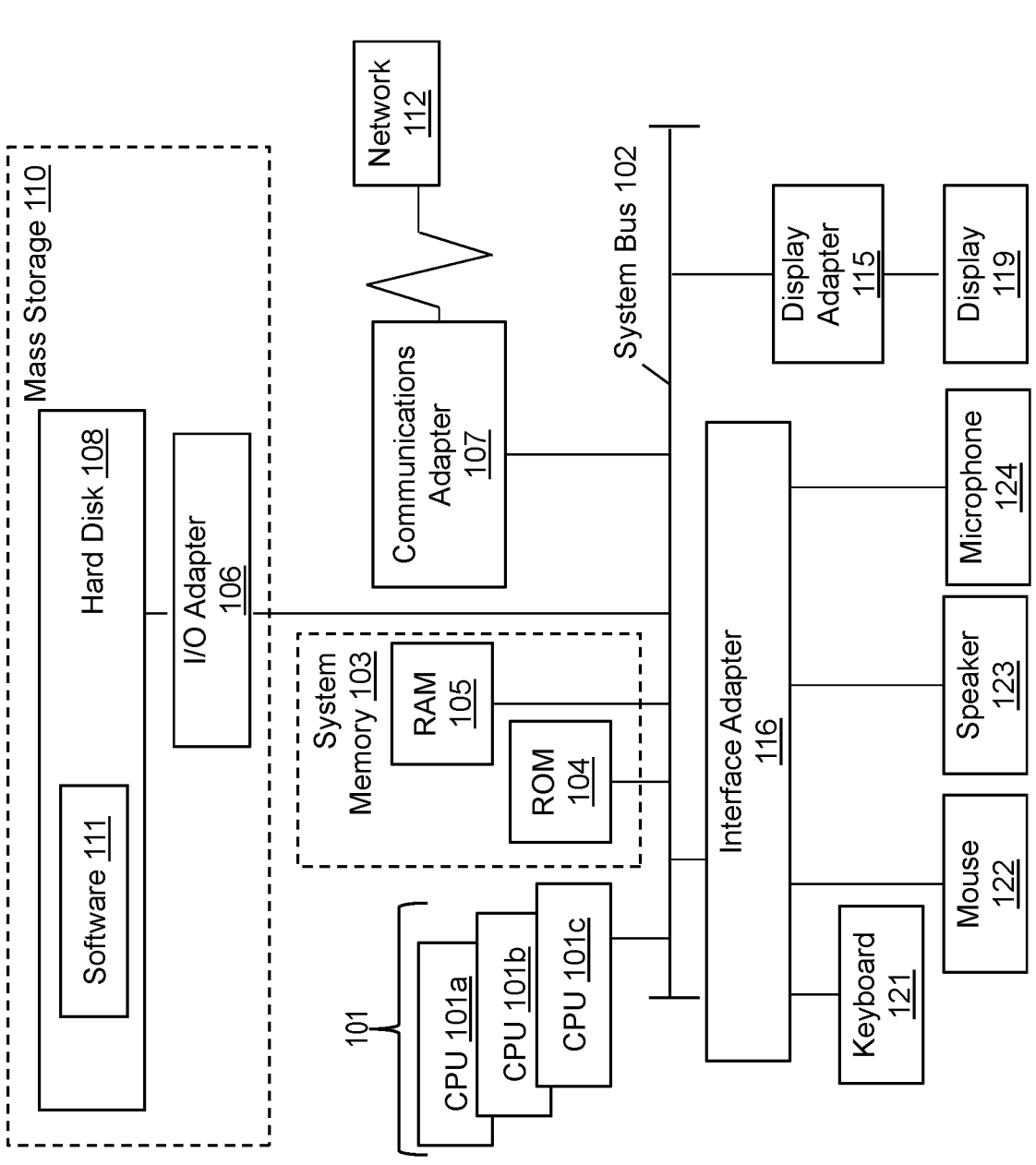
FIG. 8 depicts a block diagram of a classical computer system in accordance with one or more embodiments.

Turning now to FIG. 8, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8 the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 8.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, a microphone 124, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 8, the computer system 100 includes processing capability in the form of the processors 101, storage capability including the system memory 103 and the mass storage 110, input means such as the keyboard 121, the mouse 122, and the microphone 124, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 8 is not intended to indicate that the computer system 100 is to include all of the components shown in FIG. 8. Rather, the computer system 100 can include any appropriate fewer or additional components not illustrated in FIG. 8 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

While the disclosure has been described with reference to various embodiments, it will be understood by those skilled in the art that changes may be made and equivalents may be substituted for elements thereof without departing from its scope. The various tasks and process steps described herein can be incorporated into a more comprehensive procedure or process having additional steps or functionality not described in detail herein. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

Unless defined otherwise, technical and scientific terms used herein have the same meaning as is commonly understood by one of skill in the art to which this disclosure belongs.

Various embodiments of the invention are described herein with reference to the related drawings. The drawings depicted herein are illustrative. There can be many variations to the diagrams and/or the steps (or operations) described therein without departing from the spirit of the disclosure. For instance, the actions can be performed in a differing order or actions can be added, deleted or modified. All of these variations are considered a part of the present disclosure.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. The term "or" means "and/or" unless clearly indicated otherwise by context.

The terms "received from", "receiving from", "passed to", "passing to", etc. describe a communication path between two elements and does not imply a direct connection between the elements with no intervening elements/connections therebetween unless specified. A respective communication path can be a direct or indirect communication path.

The corresponding structures, materials, acts, and equivalents of all means or step plus function elements in the claims below are intended to include any structure, material, or act for performing the function in combination with other claimed elements as specifically claimed.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product at any possible technical detail level of integration. The computer program product may include a computer readable storage medium (or media) having computer readable program instructions thereon for causing a processor to carry out aspects of the present invention.

Various embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments described herein have been presented for purposes of illustration, but are not intended to be exhaustive or limited to the form(s)

disclosed. The embodiments were chosen and described in order to best explain the principles of the disclosure. Many modifications and variations will be apparent to those of ordinary skill in the art without departing from the scope and spirit of the described embodiments. The terminology used herein was chosen to best explain the principles of the various embodiments, the practical application or technical improvement over technologies found in the marketplace, or to enable others of ordinary skill in the art to understand the embodiments described herein.

What is claimed is:

1. A method of reducing a qubit count employed by a quantum circuit of a geometrically enhanced Clifford quantum computer, the method comprising:

performing a geometric transformation to boundaries of a three-dimensional (3D) toric code, wherein a Hermite normal form is utilized to parameterize the geometric transformation;

transforming the 3D toric code to a two-dimensional (2D) toric code for the quantum circuit, wherein the 2D toric code comprises plaquettes; and causing the quantum circuit to execute the 2D toric code for providing logical qubits.

2. The method of claim 1, wherein a state of the 3D toric code is sliced to generate a Bell pair across two logical qubits in the 2D toric code.

3. The method of claim 2, wherein the Hermite normal form is chosen to be sliceable based at least in part on even numbers on a diagonal of the Hermite normal form.

4. The method of claim 1, wherein the geometric transformation comprises rotating the boundaries of the 3D toric code.

5. The method of claim 4, wherein the Hermite normal form is chosen to be sliceable based at least in part on a composite determinant of the Hermite normal form.

6. The method of claim 1, wherein a state of the 3D toric code is sliced to generate a Greenberger-Horne-Zeilinger (GHZ) state across multiple logical qubits in the 2D toric code.

7. The method of claim 1, wherein lattices of the 3D toric code are sliceable into the 2D toric code by measuring out a subset of physical qubits, where the subset of physical qubits is determined by the Hermite normal form.

8. The method of claim 1, wherein the 2D toric code encodes physical qubits of the quantum circuit into the logical qubits such that quantum operations are performed on the logical qubits.

9. A system having a memory, computer readable instructions for reducing a qubit count employed by a quantum circuit of a geometrically enhanced Clifford quantum computer, and one or more processors for executing the computer readable instructions, the computer readable instructions controlling the one or more processors to perform operations comprising:

performing a geometric transformation to boundaries of a three-dimensional (3D) toric code, wherein a Hermite normal form is utilized to parameterize the geometric transformation;

transforming the 3D toric code to a two-dimensional (2D) toric code for the quantum circuit, wherein the 2D toric code comprises plaquettes; and causing the quantum circuit to execute the 2D toric code for providing logical qubits.

10. The system of claim 9, wherein a state of the 3D toric code is sliced to generate a Bell pair across two logical qubits in the 2D toric code.

11. The system of claim 10, wherein the Hermite normal form is chosen to be sliceable based at least in part on even numbers on a diagonal of the Hermite normal form.

12. The system of claim 10, wherein the geometric transformation comprises rotating the boundaries of the 3D toric code.

13. The system of claim 12, wherein the Hermite normal form is chosen to be sliceable based at least in part on a composite determinant of the Hermite normal form.

14. The system of claim 9, wherein a state of the 3D toric code is sliced to generate a Greenberger-Horne-Zeilinger (GHZ) state across multiple logical qubits in the 2D toric code.

15. The system of claim 9, wherein lattices of the 3D toric code are sliceable into the 2D toric code by measuring out a subset of physical qubits, where the subset of physical qubits is determined by the Hermite normal form.

16. The system of claim 9, wherein the 2D toric code encodes physical qubits of the quantum circuit into the logical qubits such that quantum operations are performed on the logical qubits.

17. A method of reducing error in a quantum circuit of a geometrically enhanced Clifford quantum computer, the method comprising:

performing an entangling operation for a positive x-axis of a three-dimensional (3D) cubic lattice on which a 3D toric code is defined, wherein an ancilla qubit is in a center of a first plaquette in the 3D cubic lattice, wherein another ancilla qubit is in a center of a second plaquette in the 3D cubit lattice, wherein yet another ancilla qubit is in a center of a third plaquette in the 3D cubit lattice, wherein data qubits are respectively positioned on edges of the 3D cubic lattice, wherein the entangling operation in the positive x-axis of the first plaquette is between the ancilla qubit and a first one of the data qubits on a first one of the edges;

performing the entangling operation for a negative x-axis of the first plaquette between the ancilla qubit and a second one of the data qubits on a second one of the edges in the negative x-axis;

performing the entangling operation for a positive y-axis of the second plaquette between the another ancilla qubit and another first one of the data qubits on another first one of the edges in the positive y-axis;

performing the entangling operation for a negative y-axis of the second plaquette between the another ancilla qubit and another second one of the data qubits on another second one of the edges in the negative y-axis;

performing the entangling operation for a positive z-axis of the third plaquette between the yet another ancilla qubit and yet another first one of the data qubits on yet another first one of the edges in the positive z-axis; and performing the entangling operation for a negative z-axis of the third plaquette between the yet another ancilla qubit and yet another second one of the data qubits on yet another second one of the edges in the negative z-axis, wherein an ordering of the entangling operation for the positive and negative x-axes, y-axes, and z-axes has an effect that reduces a propagation of errors on the quantum circuit.

18. The method of claim 17, wherein the entangling operation comprises a controlled NOT (CNOT) gate operation or a controlled Z (CZ) gate operation.

19. The method of claim 17, wherein any error on the ancilla qubit propagates for detection to at least one of the first one or second one of the data qubits.

* * * * *